(12) United States Patent
Wu et al.

(10) Patent No.: US 11,695,414 B2
(45) Date of Patent: **\*Jul. 4, 2023**

(54) MULTI-GATED I/O SYSTEM, SEMICONDUCTOR DEVICE INCLUDING AND METHOD FOR GENERATING GATING SIGNALS FOR SAME

(71) Applicant: TAIWAN SEMICONDUCTOR MANUFACTURING COMPANY, LTD., Hsinchu (TW)

(72) Inventors: Shao-Te Wu, Hsinchu (TW); Chia-Jung Chang, Hsinchu (TW); Shih-Peng Chang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,953

(22) Filed: Dec. 8, 2021

(65) Prior Publication Data

US 2022/0103171 A1   Mar. 31, 2022

Related U.S. Application Data

(63) Continuation of application No. 17/028,727, filed on Sep. 22, 2020, now Pat. No. 11,201,618.

(Continued)

(51) Int. Cl.
  *H03K 3/012* (2006.01)
  *H03K 5/00* (2006.01)
  (Continued)

(52) U.S. Cl.
  CPC ....... *H03K 17/6872* (2013.01); *G06F 30/392* (2020.01); *H03K 19/017509* (2013.01)

(58) Field of Classification Search
  None
  See application file for complete search history.

(56) References Cited

U.S. PATENT DOCUMENTS

| 6,369,613 B1 | 4/2002 | Costello et al. |
| 7,260,442 B2 | 8/2007 | Hwang et al. |
| (Continued) | | |

FOREIGN PATENT DOCUMENTS

| KR | 20130009809 | 1/2013 |
| WO | 2011119497 | 9/2011 |

OTHER PUBLICATIONS

Office Action dated Sep. 29, 2021 for corresponding case No. TW 11020949300. (pp. 1-4).

(Continued)

*Primary Examiner* — Kenneth B Wells
(74) *Attorney, Agent, or Firm* — Hauptman Ham, LLP

(57) ABSTRACT

A method of generating multiple gating signals for a multi-gated input/output (I/O) system. The system includes an output level shifter and an output driver which are coupled in series between an output node of a core circuit and an external terminal of a corresponding system. The method includes: generating first and second gating signals having corresponding first and second waveforms, the first waveform transitioning from a non-enabling state to an enabling state before the second waveform transitions from the non-enabling state to the enabling state; receiving the first gating signal at the output level shifter; and receiving the second gating signal at the output driver.

20 Claims, 25 Drawing Sheets

Related U.S. Application Data

(60) Provisional application No. 62/990,298, filed on Mar. 16, 2020.

(51) Int. Cl.
    *H03K 17/22*     (2006.01)
    *H03K 19/003*     (2006.01)
    *H03K 17/687*     (2006.01)
    *G06F 30/392*     (2020.01)
    *H03K 19/0175*     (2006.01)

(56) References Cited

U.S. PATENT DOCUMENTS

| | | |
|---|---|---|
| 7,295,052 B2 | 11/2007 | Chen |
| 7,888,966 B1 | 2/2011 | Davidson et al. |
| 9,256,709 B2 | 2/2016 | Yu et al. |
| 9,800,230 B1 | 10/2017 | Chen et al. |
| 9,806,611 B2 | 10/2017 | Wang |
| 2003/0197525 A1 | 10/2003 | Song et al. |
| 2007/0262790 A1* | 11/2007 | Cheon ............ H03K 19/018528 326/81 |
| 2013/0002300 A1 | 1/2013 | Fiedler |
| 2014/0002146 A1 | 1/2014 | Kim |
| 2014/0040838 A1 | 2/2014 | Liu et al. |
| 2015/0278429 A1 | 10/2015 | Chang |

OTHER PUBLICATIONS

Office Action dated Feb. 22, 2022 for corresponding case No. KR 10-2020-0181226. (pp. 1-4).

\* cited by examiner

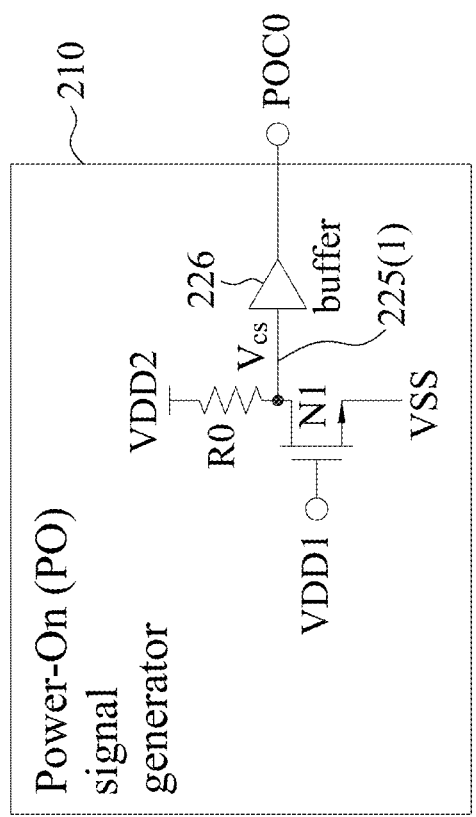
FIG. 2B
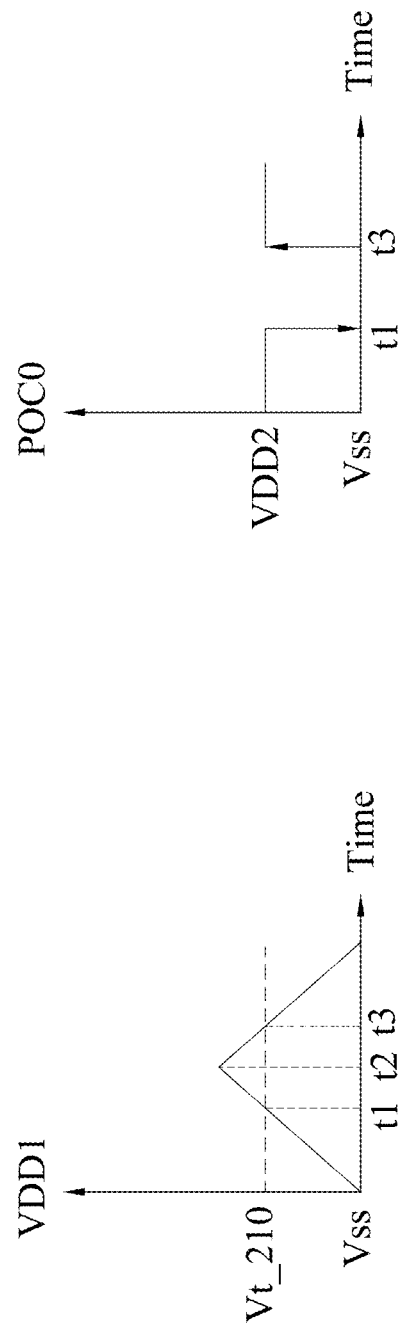
FIG. 2D
FIG. 2C

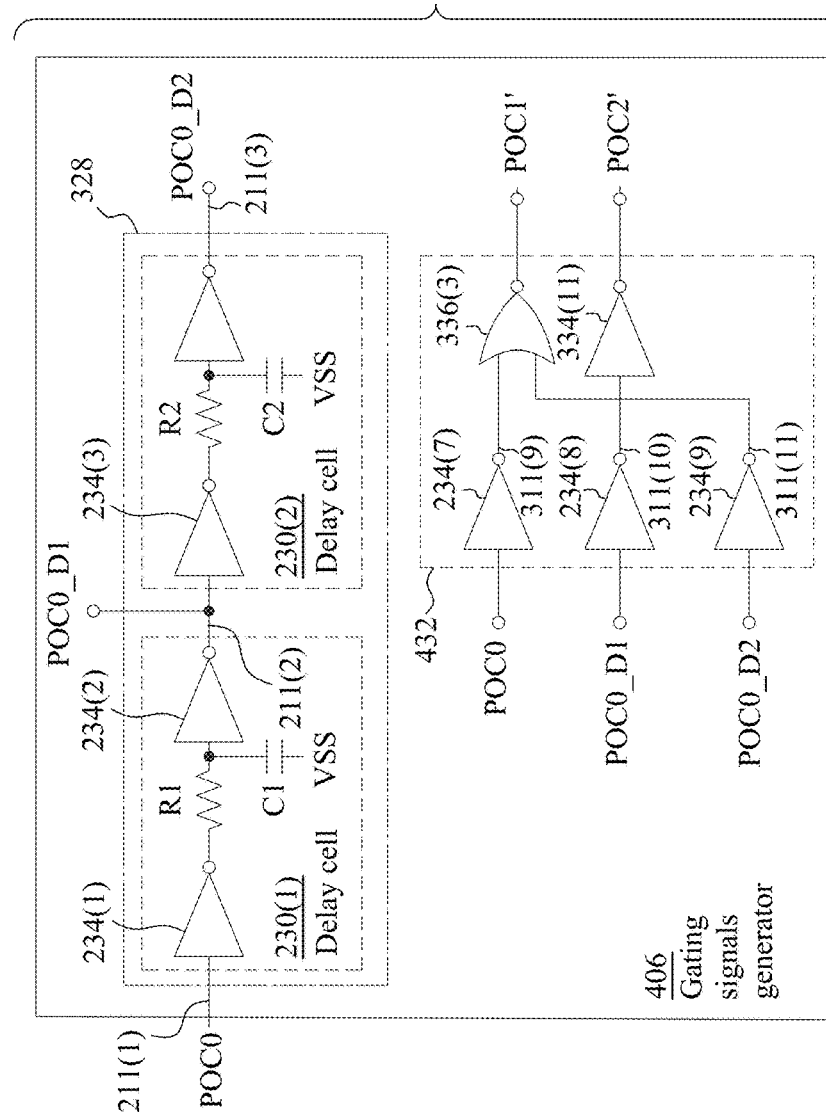
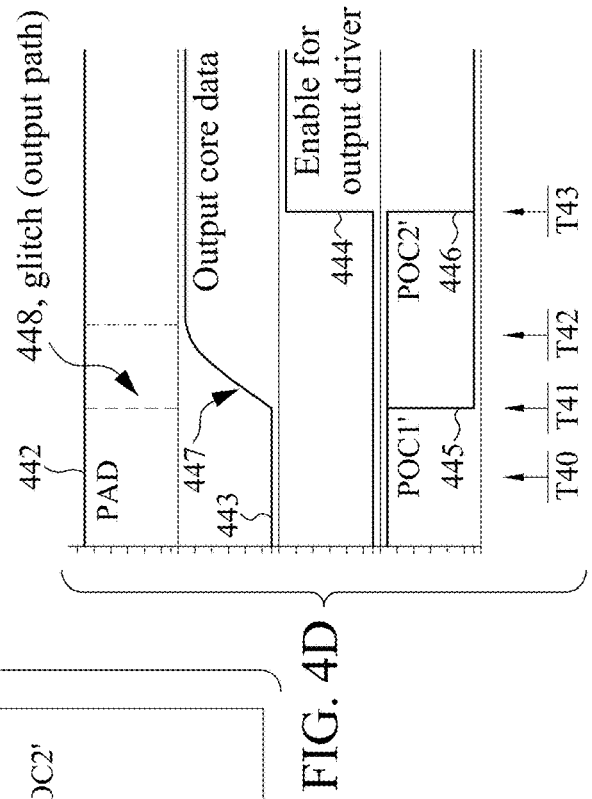
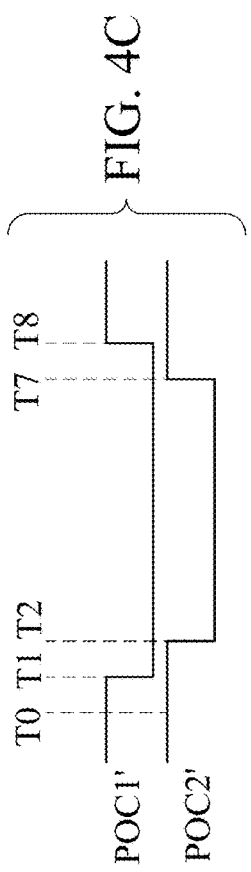
FIG. 4B
FIG. 4D
FIG. 4C 632
enable output level shifter, input buffer and input level shifter 634
after output signal of output level shifter has stabilized, enable output driver 642
enable output level shifter, output driver and input buffer 644
after output signal of input buffer has stabilized, enable input level shifter

MULTI-GATED I/O SYSTEM, SEMICONDUCTOR DEVICE INCLUDING AND METHOD FOR GENERATING GATING SIGNALS FOR SAME

PRIORITY CLAIM

The present application is a continuation of U.S. application Ser. No. 17/028,727, filed Sep. 22, 2020, now U.S. Pat. No. 11,201,618, issued Dec. 14, 2021, which claims the priority of U.S. Provisional Application No. 62/990,298, filed Mar. 16, 2020, and each of which is incorporated herein by reference in its entirety.

BACKGROUND

Integrated circuit chips (IC chips) or semiconductor die are typically encapsulated in a package to protect the circuitry formed on the semiconductor die from external elements. An IC chip includes bond pads formed thereon. Bond wires, or other electrical connection means, are used to electrically connect the bond pads to corresponding pins or leads of the integrated circuit package. The bond pads can be power pads for power supply voltage connections and input/output (I/O) pads for connecting to input and output signals of the integrated circuit. An I/O circuit is a circuit coupled to an I/O pad of a chip and configured to communicate input and/or output signals with other chips in the integrated circuit system and/or entities external to the IC chip.

In terms of states of a signal, a glitch is an undesired transition state that occurs before a signal settles to its intended value. The occurrence of one or more glitches (glitching) poses a challenge for an I/O circuit, e.g. during power ramp-up of the I/O circuit.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

FIG. 2B is a schematic diagram of a power-on (PO) signal generator, in accordance with some embodiments.

FIGS. 2C-2D are graphs of corresponding waveforms, in accordance with some embodiments.

FIG. 4B is a schematic diagram of gating signals generator, in accordance with some embodiments.

FIG. 4C is a graph of waveforms, in accordance with some embodiments.

FIG. 4D is a graph of waveforms, in accordance with some embodiments.

DETAILED DESCRIPTION

Figure 1:
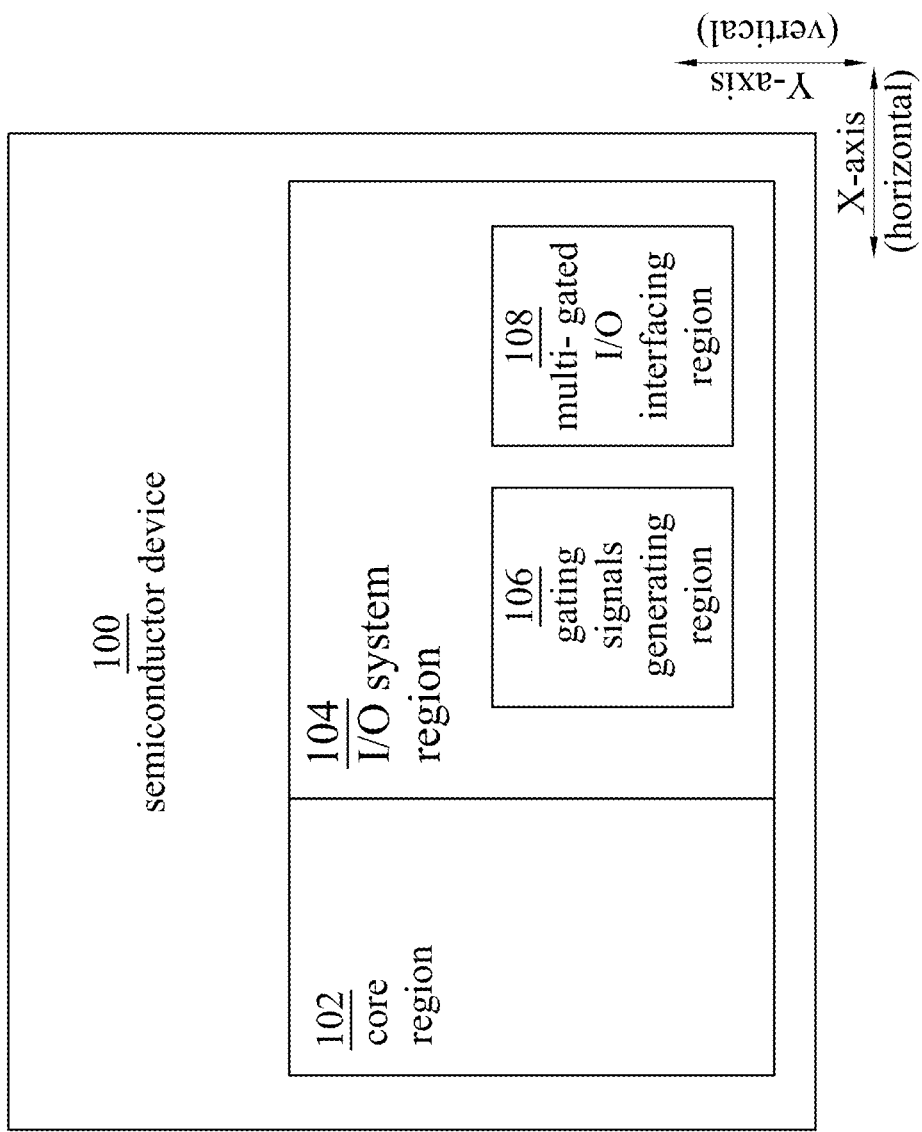
FIG. 1 is a block diagram of a semiconductor device, in accordance with at least one embodiment of the present disclosure.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a system for generating gated power-on control signals includes: a multi-gated input/- output (I/O) interface configured to receive at least first and second gating signals; and a gating signals generator configured to generate at least the first and second gating signals for the multi-gated I/O interface. In some embodiments, the multi-gated I/O interface includes an output level shifter and an output driver coupled in series between an output node of a core circuit and an external terminal of the system, and an input buffer and an input level shifter coupled in series between the external terminal of the system and an input node of the core circuit, and wherein the output level shifter, the output driver, the input buffer and the input level shifter are correspondingly configured to receive at least the first and second gating signals.

According to another approach, a single-gated I/O interface and a power-on (PO) controller are provided, wherein the single-gated I/O interface includes: an output level shifter and an output driver coupled in series between an output node of a core circuit and an external terminal of the system; and an input buffer and an input level shifter coupled in series between the external terminal of the system and an input node of the core circuit. According to the other approach, the PO controller generates a PO-control (POC) signal and provides the same POC signal as an enabling signal to each of the components in the singly-gated I/O interface, namely the output level shifter, the output driver, the input buffer and the input level shifter. Consequently, the singly-gated I/O interface is susceptible to a first glitching problem in which the output driver transmits an output signal of the output level shifter before the output signal of the output level shifter has stabilized, a second glitching problem in which the input level shifter begins to shift a level of an output from the input buffer before the output signal of the input buffer has stabilized, or the like. By contrast, in some embodiments, the system for generating gated power-on control signals avoids the first glitching issue by enabling the output level shifter with the first gating signal, waiting for an output signal of the output level shifter to stabilize, and then enabling the output driver with the second gating signal. Also by contrast, in some embodiments, the system for generating gated power-on control signals avoids the second glitching issue by enabling the input buffer with the first gating signal, waiting for the output signal of the input buffer to stabilize, and then enabling the input level shifter with the second gating signal.

FIG. 1 is a block diagram of a semiconductor device 100, e.g., an integrated circuit (IC) chip, in accordance with at least one embodiment of the present disclosure.

In FIG. 1, semiconductor device 100 includes, among other things, a core circuit region 102 and an input/output (I/O) system region 104. Among other things, I/O system region 104 includes a gating signals generating region 106 and a multi-gated I/O interfacing region 108. Among other things, gating signals generating region 106 is configured to generate at least first and second gating signals. Among other things, multi-gated I/O interfacing region 108 is configured to receive and correspondingly be controlled by the first and second gating signals.

In some embodiments, gating signals generating region 106 is further configured to generate a third gating signal as well as the first and second gating signals, and multi-gated I/O interfacing region 108 is further configured to receive and be controlled by the third gating signal as well as by the first and second gating signals. In some embodiments, gating signals generating region 106 is further configured to generate a fourth gating signal as well as the first, second and third gating signals, and multi-gated I/O interfacing region 108 is further configured to receive and be controlled by the fourth gating signal as well as by the first, second and third gating signals. Examples of generating region 106 and multi-gated I/O interfacing region 108 are disclosed herein.

Figure 2A:
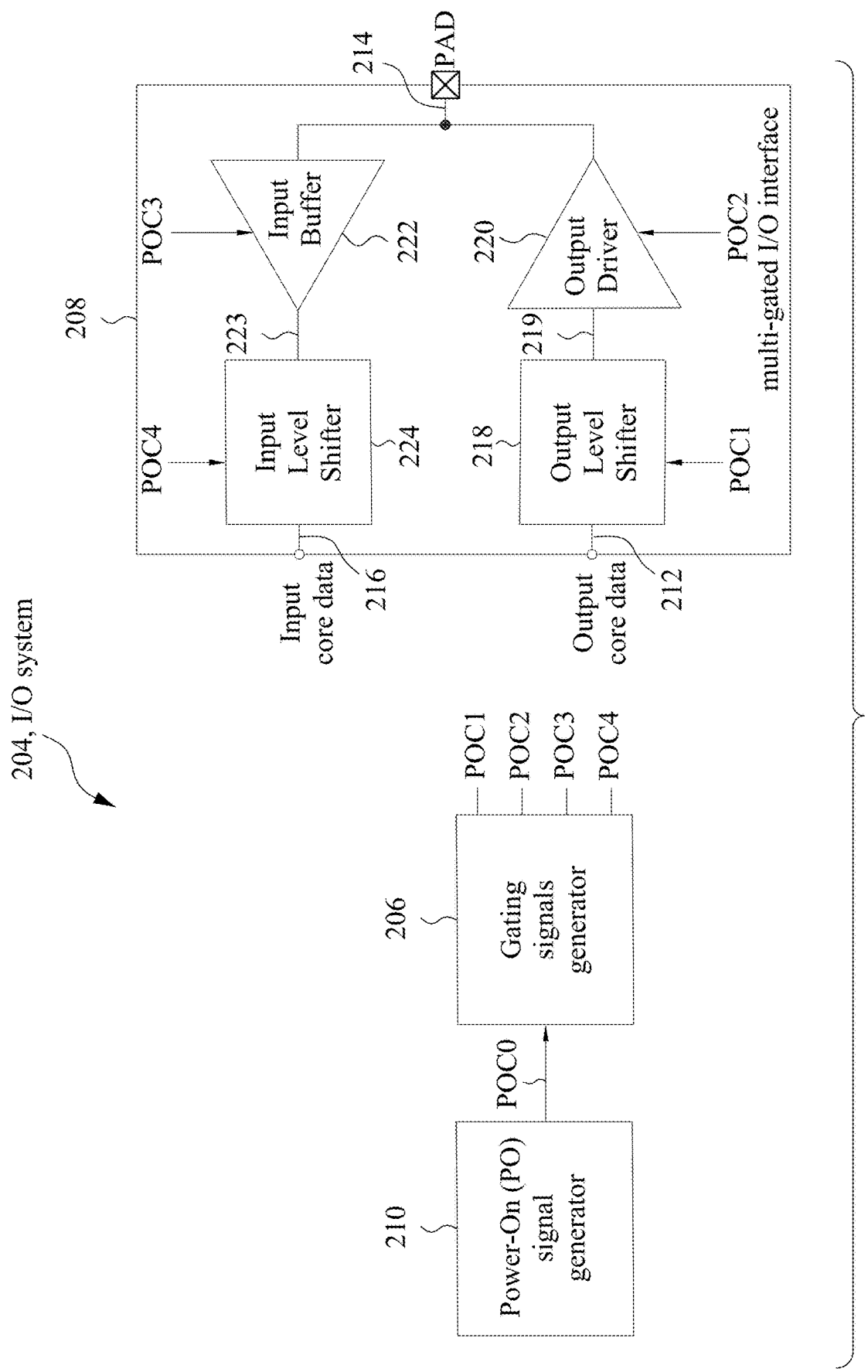
FIG. 2A is a schematic diagram of an input/output (I/O) system, in accordance with some embodiments.

FIG. 2A is a schematic diagram of an input/output (I/O) system 204, in accordance with some embodiments.

System 204 of FIG. 2A reflects a scenario in which a glitch on the output path and a glitch on the input path are prevented.

In FIG. 2A, I/O system 204 includes: a power-on (PO) signal generator 210; a gating signals generator 206; and a multi-gated I/O interface 208. PO signal generator 210 is configured to generate a power-on control (POC) signal, referred to herein as timing signal POC0; see, e.g., FIGS. 2B-2D. Gating signals generator 206 is coupled to PO signal generator 210 and configured to receive timing signal POC0 and generate first, second, third and fourth gating signals correspondingly referred to herein as gating signals POC1, POC2, POC3 and POC4; see, e.g., FIGS. 2E-2F.

Multi-gated I/O interface 208 is coupled to gating signals generator 206 and configured to receive gating signals POC1, POC2, POC3 and POC4. Because I/O interface 208 is configured to receive multiple gating signals, it is referred to as being multi-gated. Multi-gated I/O interface 208 includes: an output level shifter 218 coupled between an output terminal 212 of a core circuit (not shown but corresponding to, e.g., core region 102) and a node 219, where output terminal 212 has output core data; an output driver 220 coupled between node 219 and an external terminal 214, where external terminal 214 has a signal PAD; an input buffer 222 coupled between external terminal 214 and a node 223; and an input level shifter 224 coupled between node 223 and an input node of 216 of the core circuit (not shown but corresponding to, e.g., core region 102), where input terminal 216 has input core data.

More particularly, multi-gated I/O interface 208 is configured to receive gating signals POC1, POC2, POC3 and POC4 as follows: output level shifter 218 is configured to receive gating signal POC1 as an enablement signal; output driver 220 is configured to receive gating signal POC2 as an enablement signal; input buffer 222 is configured to receive gating signal POC3 as an enablement signal; and input level shifter 224 is configured to receive gating signal POC4 as an enablement signal. In some embodiments, output level shifter 218 is an upward level-shifter. In some embodiments, input level shifter 224 is a downward level-shifter. See, e.g., FIG. 2E-2F for the relative timing of gating signals POC1, POC2, POC3 and POC4.

FIG. 2B is a schematic diagram showing power-on control (POC) signal generator 210 in more detail, in accordance with some embodiments.

As noted, PO signal generator 210 is configured to monitor a state of a voltage VDD1 (monitored voltage VDD1) and correspondingly generate timing signal POC0. PO signal generator 210 includes: a resistor R0 coupled between a first reference voltage VDD2 and a node 225(1); an NMOS transistor N1 coupled between node 225(1) and a second reference voltage VSS; and a buffer 226 whose input is coupled to node 225(1) and whose output provides the timing signal POC0. A voltage Vcs is provided on node 225(1). The gate electrode of NMOS transistor N1 is configured to receive monitored voltage VDD1. In some embodiments, monitored voltage VDD1 is a reference voltage. In some embodiments, VDD1 is a voltage from the power domain of the core circuit, e.g., a circuit found in core region 102 of FIG. 1. The reference voltages VDD1, VDD2 and VSS relate as follows: VSS<VDD1<VDD2. In some embodiments, timing signal POC0 indicates whether VDD1 is logically high (or 'ON') or is logically low (or 'OFF'). To reduce leakage through NMOS transistor N1, typically resistor R0 has a large resistance and consequently occupies a large area. FIGS. 2G-2K and 2L-2N describe alternate versions of PO signal generator 210, in accordance with some corresponding embodiments.

Alternatively, in some embodiments, PO signal generator 210 includes components configured according to U.S. Pat. No. 9,806,611, granted Oct. 31, 2017, the entirety of which is hereby incorporated by reference. Alternatively, in some embodiments, PO signal generator 210 includes components configured according to U.S. Pat. No. 7,295,052, granted Nov. 13, 2007, the entirety of which is hereby incorporated by reference.

FIGS. 2C-2D show corresponding waveforms, in accordance with some embodiments.

More particularly, FIG. 2C is a graph of a waveform representing VDD1 of FIG. 2B, where time is the abscissa (X-axis) and values of VDD1 are the ordinate (Y-axis). In FIG. 2C, from a value of zero, the value of VDD1 increases substantially linearly, reaching a threshold voltage of PO signal generator 210, Vt_210, at a time t1, and continuing to an apex at a time t2. The waveform has a point of discontinuity at time t2. From time t2, the waveform decreases substantially linearly, reaching Vt at a time t3, and eventually reaching a value of zero.

More particularly, FIG. 2D is a graph of a waveform representing timing signal POC0 of FIG. 2B, where time is the abscissa (X-axis) and values of POC0 are the ordinate (Y-axis). Timing signal POC0 substantially follows the signal Vcs on node 225(1). Initially, when NMOS transistor N1 is turned off because the value of VDD1 is below Vt_210, the value of Vcs and thus the value of POC0 is pulled up to be substantially equal to VDD2. At time t1, when NMOS transistor N1 turns on because the value of VDD1 has reached and then exceeded Vt_210, the value of Vcs and thus the value of POC0 are pulled down to VSS by NMOS transistor N1. At time t3, when NMOS transistor N1 turns off because the value of VDD1 reaches and then falls below Vt, the value of Vcs and thus the value of POC0 again are pulled up to be substantially equal to VDD2.

Figure 2E:
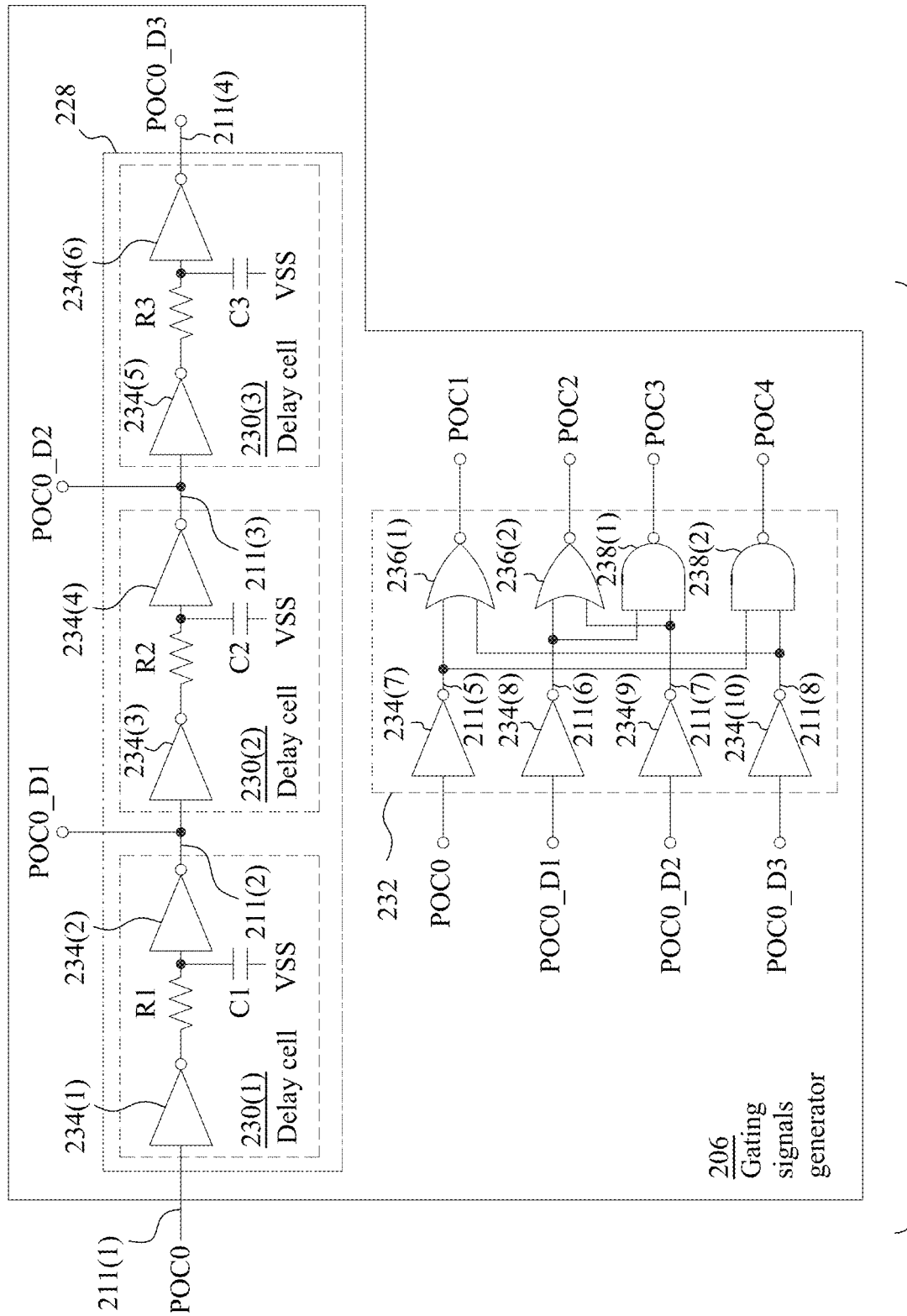
FIG. 2E is a schematic diagram of a gating signals generator, in accordance with some embodiments.

FIG. 2E is a schematic diagram showing gating signals generator 206 in more detail, in accordance with some embodiments.

Gating signals generator 206 includes a delay chain 228 and a logic circuit 232. Delay chain 228 is a daisy chain of delay cells including delay cell 230(1), 230(2) and 230(3). The output of delay cell 230(1) is coupled to the input of delay cell 230(2). The output of delay cell 230(2) is coupled to the input of delay cell 230(3). Delay cell 230(1) receives timing signal POC0 on a node 211(1) from PO signal generator 210 and generates a delayed version of timing signal POC0 on a node 211(2), where the delayed version of timing signal POC0 is referred to herein as timing signal POC0_D1. Delay cell 230(2) receives timing signal POC0_D1 from delay cell 230(1) and generates a delayed version of timing signal POC0_D1 on a node 211(3), where the delayed version of timing signal POC0_D1 is referred to herein as timing signal POC0_D2. Delay cell 230(3) receives timing signal POC0_D2 from delay cell 230(2) and generates a delayed version of timing signal POC0_D2 on a node 211(4), where the delayed version of timing signal POC0_D2 is referred to herein as timing signal POC0_D3.

In FIG. 2E, delay cell 230(1) includes an inverter 234(1), a resistor R1, a capacitor C1 and an inverter 234(2). The input of inverter 234(1) corresponds to node 211(1) and receives timing signal POC0. The resistor R1 is coupled between the output of inverter 234(1) and the input of inverter 234(2). The capacitor C1 is coupled between the input of inverter 234(2) and VSS. The output of inverter 234(2) corresponds to node 211(2). Based on simulation and/or empirical data, values of the resistor R1 and the capacitor C1 are chosen at least in part to facilitate a corresponding amount of delay by delay cell 230(1).

Delay cell 230(2) includes an inverter 234(3), a resistor R2, a capacitor C2 and an inverter 234(4). The input of inverter 234(3) corresponds to node 211(2) and receives timing signal POC0_D1. The resistor R2 is coupled between the output of inverter 234(3) and the input of inverter 234(4). The capacitor C2 is coupled between the input of inverter 234(4) and VSS. The output of inverter 234(4) corresponds to node 211(3). Based on simulation and/or empirical data, values of the resistor R2 and the capacitor C2 are chosen at least in part to facilitate a corresponding amount of delay by delay cell 230(2).

Delay cell 230(3) includes an inverter 234(5), a resistor R3, a capacitor C3 and an inverter 234(6). The input of inverter 234(5) corresponds to node 211(3) and receives timing signal POC0_D2. The resistor R3 is coupled between the output of inverter 234(5) and the input of inverter 234(6). The capacitor C3 is coupled between the input of inverter 234(6) and VSS. The output of inverter 234(6) corresponds to node 211(4). Based on simulation and/or empirical data, values of the resistor R3 and the capacitor C3 are chosen at least in part to facilitate a corresponding amount of delay by delay cell 230(3).

In FIG. 2E, logic circuit 232 includes inverters 234(7)-234(10), NOR gates 236(1)-236(2) and NAND gates 238(1)-238(2).

The input of inverter 234(7) receives timing signal POC0. The output of inverter 234(7) provides an inverted version of timing signal POC0 on a node 211(5), the inverted version of timing signal POC0 being referred to herein as the timing signal POC0_bar. The input of inverter 234(8) receives timing signal POC0_D1. The output of inverter 234(8) provides an inverted version of timing signal POC0_D1 on a node 211(6), the inverted version of timing signal POC0_D1 being referred to herein as timing signal POC0_D1_bar. The input of inverter 234(9) receives timing signal POC0_D2. The output of inverter 234(9) provides an inverted version of timing signal POC0_D2 on a node 211(7), the inverted version of timing signal POC0_D2 being referred to herein as timing signal POC0_D2_bar. The input of inverter 234(10) receives timing signal POC0_D3. The output of inverter 234(10) provides an inverted version of timing signal POC0_D3 on a node 211(8), the inverted version of timing signal POC0_D3 being referred to herein as timing signal POC0_D3_bar.

In FIG. 2E, NOR gate 236(1) receives the POC0_bar timing signal and timing signal POC0_D3_bar and generates gating signal POC1. NOR gate 236(2) receives timing signal POC0_D1_bar and timing signal POC0_D2_bar and generates gating signal POC2. NAND gate 238(1) receives timing signal POC0_D1_bar and timing signal POC0_D2_bar and generates gating signal POC3. NAND gate 238(2) receives the timing signal POC0_bar and timing signal POC0_D3_bar and generates gating signal POC4.

Figure 2G:
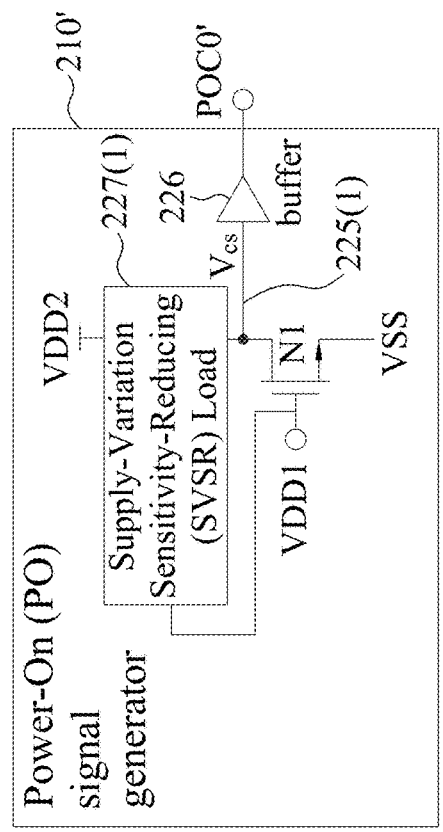
FIGS. 2G-2H are corresponding schematic diagrams of a PO signal generator, in accordance with some embodiments.
Figure 2F:
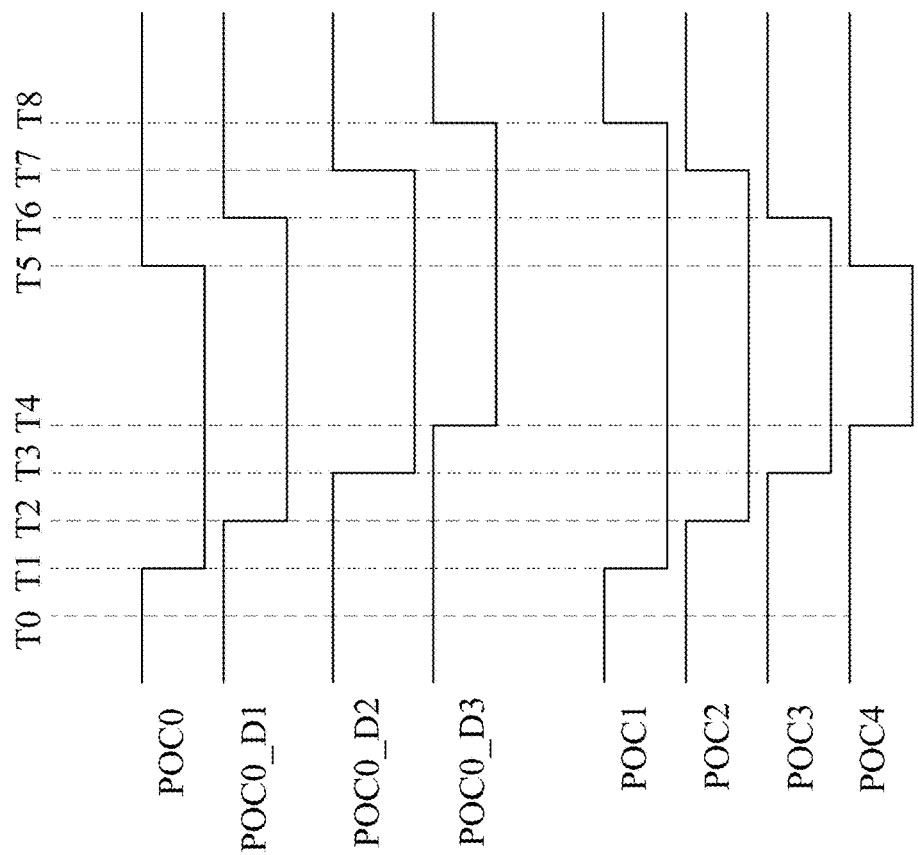
FIG. 2F is a graph of waveforms, in accordance with some embodiments.

FIG. 2F is a graph of waveforms, in accordance with some embodiments.

More particularly, FIG. 2F is a graph of waveforms representing timing signal POC0, timing signal POC0_D1, timing signal POC0_D2, timing signal POC0_D3, gating signal POC1, gating signal POC2, gating signal POC3, and gating signal POC4, each of which has a logical high value (or 'logical one' value) at a time T0.

At a time T1, timing signal POC0 and gating signal POC1 transition to a logical low value (or 'logical zero' value), with a result that gating signal POC1 enables output level shifter 218 of FIG. 2A.

At a time T2, which is after the output of output level shifter 218 has stabilized, timing signal POC0_D1 and gating signal POC2 transition to a logical low value, with a result that gating signal POC2 enables output driver 220 of FIG. 2A.

At a time T3, timing signal POC0_D2 and gating signal POC3 transition to a logical low value, with a result that gating signal POC3 enables input buffer 222 of FIG. 2A. In some embodiments, the time T3 is after the PAD signal on terminal 214 has stabilized.

At a time T4, which is after the output of input buffer 222 has stabilized, timing signal POC0_D3 and gating signal POC4 transition to a logical low value, with a result that gating signal POC4 enables input level shifter 224 of FIG. 2A.

At a time T5, timing signal POC0 and gating signal POC4 transition to a logical high value (or 'logical one' value), with a result that gating signal POC4 disables input level shifter 224. At a time T6, timing signal POC0_D1 and gating signal POC3 transition to a logical high value, with a result that gating signal POC3 disables input buffer 222. At a time T7, timing signal POC0_D2 and gating signal POC2 transition to a logical high value, with a result that gating signal POC2 disables output driver 220. At a time T8, timing signal POC0_D3 and gating signal POC1 transition to a logical high value, with a result that gating signal POC1 disables output level shifter 218.

In FIG. 2F, according to some embodiments, the cascaded transitions of gating signals POC1, POC2, POC3 and POC4 at corresponding times T1, T2, T3 and T4 assume a circumstance in which components (not shown) in the core (not shown, but see core region 102 FIG. 1) are ready for I/O exchange with I/O system 204. Also in FIG. 2F, according to some embodiments, the cascaded transitions of gating signals POC4, POC3, POC2 and POC1 at corresponding times T5, T6, T7 and T8 assume a circumstance in which components (not shown) in the core (not shown, but see core region 102 FIG. 1) are not ready for I/O exchange with I/O system 204.

In at least some embodiments, I/O system 204 avoids the first glitching issue suffered by the other approach because gating signals generator 206 is configured to enable output level shifter 218 with gating signal POC1, wait for an output signal of output level shifter 218 to stabilize, and then enable output driver 220 with gating signal POC2. In at least some embodiments, I/O system 204 avoids the second glitching issue suffered by the other approach because gating signals generator 206 is configured to enable input buffer 222 with gating signal POC3, wait for the output signal of input buffer 222 to stabilize, and then enable input level shifter 224 with gating signal POC4.

Figure 2I:
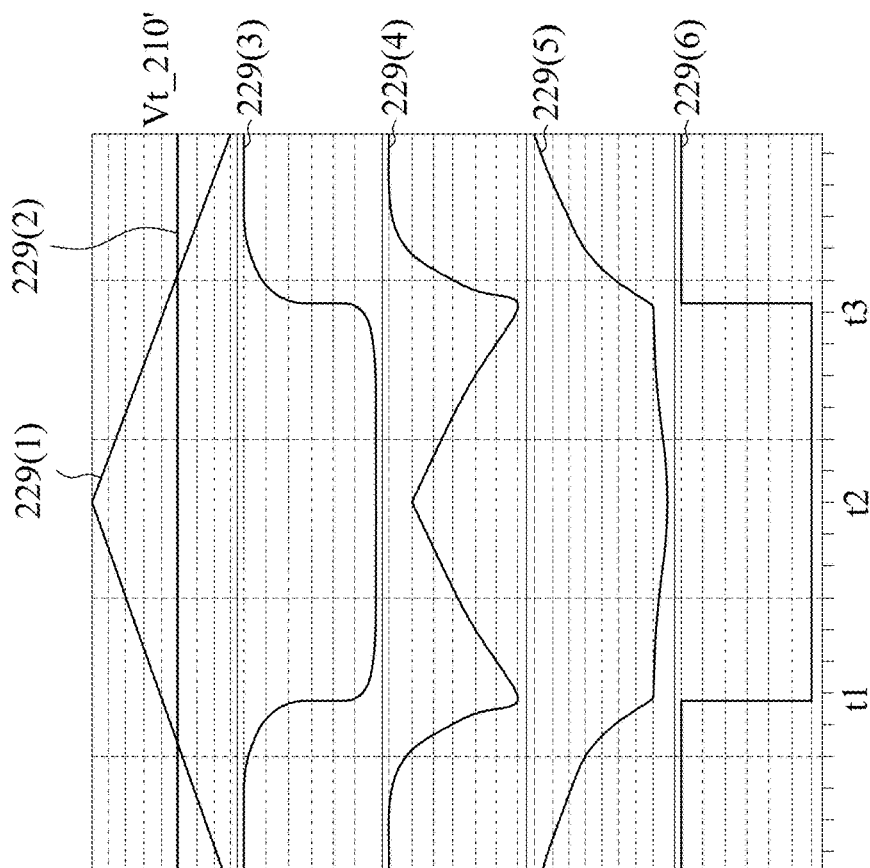
FIGS. 2I-2K are graphs of corresponding waveforms, in accordance with some embodiments.
Figure 2H:
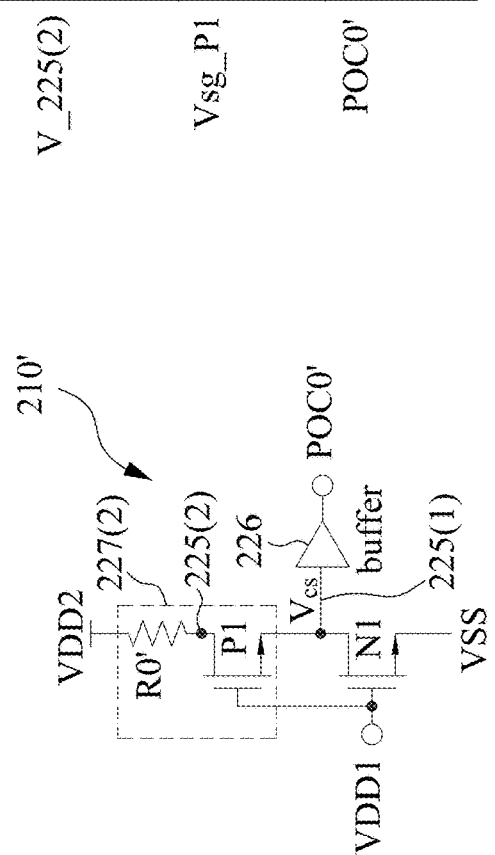
Figures 2J, 2K:
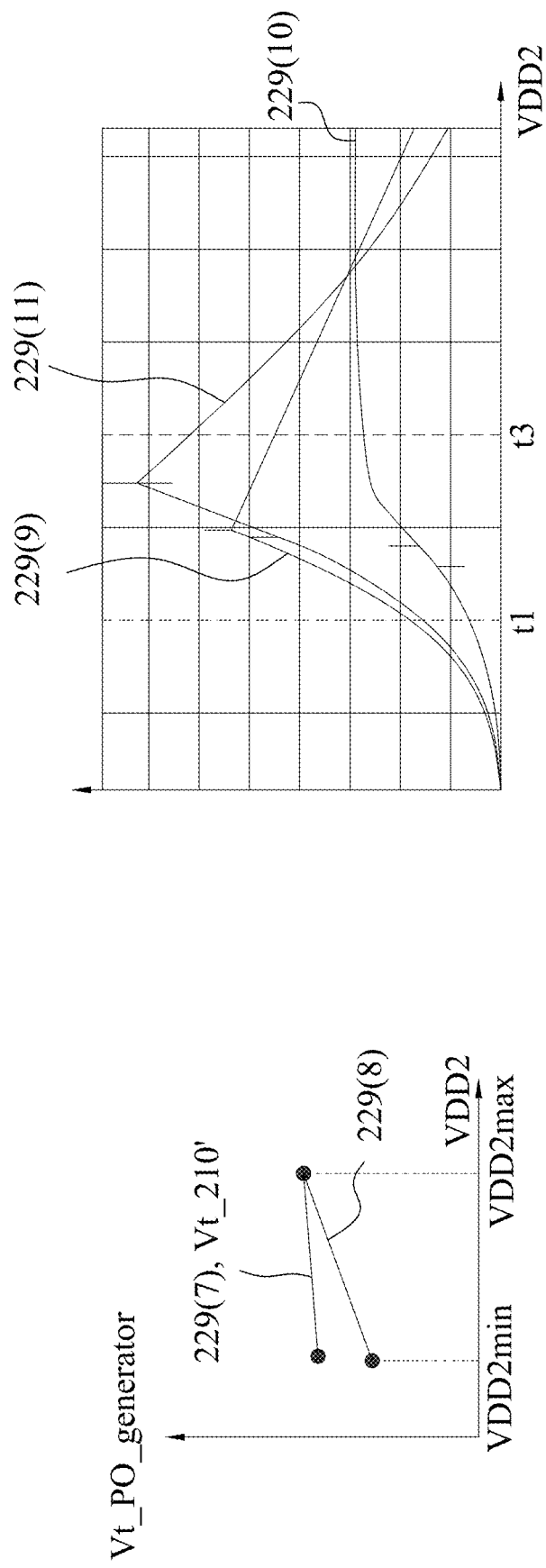

FIG. 2G is a schematic diagram of a power-on control (POC) signal generator 210', in accordance with some embodiments. FIG. 2H is a schematic diagram showing POC signal generator 210' in more detail, in accordance with some embodiments. FIGS. 2I-2K are graphs of corresponding waveforms, in accordance with some embodiments.

PO signal generator 210' is similar to PO signal generator 210. For brevity, the discussion will focus more on differences between FIGS. 2G-2K and FIGS. 2B-2D than on similarities.

PO signal generator 210' is configured to monitor a state of a voltage VDD1 (monitored voltage VDD1) and correspondingly generate timing signal POC0'. As compared to PO signal generator 210 of FIG. 2B, PO signal generator 210' of FIG. 2G includes a supply-variation sensitivity-reducing (SVSR) load 227(1) coupled between first reference voltage VDD2 and node 225(1). Also in FIG. 2G, the output of buffer 226 provides the timing signal POC0' rather than the timing signal POC0 as in FIG. 2B. The voltage on the gate electrode of NMOS transistor N1, namely, reference voltage VDD1, is fed back as an input to SVSR load 227(1).

In FIG. 2H, SVSR load 227(1) is shown in more detail. SVSR load 227(1) includes a resistor R0' coupled between first reference voltage VDD2 and a node 225(2); and a PMOS transistor P1 coupled between node 225(2) and node 225(1). The gate electrode of PMOS transistor P1 is configured to receive reference voltage VDD1.

Again, FIG. 2I is a graph of waveforms in accordance with some embodiments. More particularly, FIG. 2I is a graph of waveforms related to the operation of PO signal generator 210' of FIGS. 2G-2H. In FIG. 2I, it is assumed that VDD2 is substantially constant.

FIG. 2I includes: a waveform 229(1) representing VDD1; a waveform 229(2) representing a threshold voltage of PO signal generator 210', Vt_210'; a waveform 229(3) representing Vcs on node 225(1); a waveform 229(4) representing a voltage, V_225(2), on node 225(2); a waveform 229(5) representing a source-to-gate voltage of PMOS transistor P1, Vsg_P1; and a waveform 229(6) representing timing signal POC0'.

In FIG. 2I, when VDD1 waveform 229(1) is well below the threshold of NMOS transistor N1 Vt_N1, NMOS transistor N1 is turned off, each of Vcs waveform 229(3), V_225(2) waveform 229(4) and Vsg_P1 waveform 229(5) is pulled to a logical high value and timing signal POC0' waveform 229(6) is pulled to a logical high value. The transition from a logical high value to a logical low value at time t1 is sharp for timing signal POC0' waveform 229(6), and, as compared to timing signal POC0' waveform 229(6), progressively more gradual for Vcs waveform 229(3), V_225(2) waveform 229(4) and Vsg_P1 waveform 229(5). In some embodiments, a sharp transition of a signal is a step-like transition. In some embodiments, a sharp transition of a signal is similar to transitions in a square wave. In some embodiments in which a transition of a first signal is described as sharp and corresponding transitions of second and third signals are described as progressively more gradual, the transition of the second signal is curvilinear as compared to the sharp transition of the first signal, and the transition of the third signal is more curvilinear as compared to the transition of the second signal. In some embodiments in which a transition of a first signal is described as sharp and corresponding transitions of second and third signals are described as progressively more gradual, the transition of the second signal is rounded as compared to the sharp transition of the first signal, and the transition of the third signal is more rounded as compared to the transition of the second signal.

When VDD1 waveform 229(1) reaches and rises above Vt_N1 at time t1, NMOS transistor N1 turns on, and each of Vcs waveform 229(3), V225(2) waveform 229(4) and Vsg_P1 waveform 229(5) is pulled down to a logical low value and timing signal POC0' is pulled down to a logical low value.

VDD1 waveform 229(1) peaks at time t2. Between time t1 and time t2, V_225(2) waveform 229(4) substantially follows VDD1 waveform 229(1).

In FIG. 2I, when VDD1 waveform 229(1) falls below Vt_N1 at time t3, NMOS transistor N1 is turned off, each of Vcs waveform 229(3), V_225(2) waveform 229(4) and Vsg_P1 waveform 229(5) is pulled up to a logical high value, and timing signal POC0' is pulled up to a logical high value. The transition from a logical low value to a logical high value at time t3 is sharp for timing signal POC0' waveform 229(6), and, as compared to timing signal POC0' waveform 229(6), progressively more gradual for Vcs waveform 229(3), V_225(2) waveform 229(4) and Vsg_P1 waveform 229(5).

In some embodiments in which it is assumed that VDD2 is substantially constant, Vt_210' is about 0.349 volts. In some embodiments in which it is assumed that VDD2 is substantially constant, the following is true: a logical low value is VSS, e.g., zero volts; a logical high value of Vcs waveform 229(3), V_225(2) waveform 229(4), Vsg_P1 waveform 229(5), and timing signal POC0' is about 1.2 volts; and a peak value of VDD1 waveform 229(1) is about 0.75 volts. In some embodiments in which VDD2 exhibits variation, a maximum value of VDD2 is about 1.2 volts.

Another approach (AA) for configuring a PO signal generator (POSG) (not shown) is similar to PO signal generator 210' of FIG. 2B except that resistor R0 of FIG. 2B is replaced by a weak PMOS transistor, P_weak (not shown), in order to reduce leakage current through NMOS transistor N1. Typically, P_weak is implemented as a long channel PMOS transistor or a stack of PMOS transistors, either of which implementations have a corresponding disadvantage of occupying a large area. Despite reducing the leakage current overall, however, the POSG according to the other approach is more susceptible to variations in VDD2, which negatively affects leakage current, and furthermore worsens variations in the threshold voltage of the POSG, Vt_POSG_AA (not shown) as compared to Vt_210 of FIG. 2C.

Again, FIG. 2J is a graph of waveforms in accordance with some embodiments. More particularly, FIG. 2J is a graph of waveforms representing threshold voltages of PO signal generators.

FIG. 2J includes a waveform 229(7) representing Vt_210' and a waveform 229(8) representing Vt_POSG_AA. In FIG. 2J, where VDD2 is the abscissa (X-axis) and threshold voltage for a corresponding PO signal generator is the ordinate (Y-axis).

The slope of Vt_210' waveform 229(7) is smaller than the slope of Vt_POSG_AA waveform 229(8). SVSR load 227(1) helps reduce the slope of Vt_210' waveform 229(7) by reducing the effects of variations in VDD2 upon the operation of PO signal generator 210'. When VDD2 varies from a low value to a high value, Vsg_P1 is larger, which strengthens the current conducting capability of PMOS transistor P1 and results in a greater/higher value of Vt_210'.

A benefit of SVSR load 227(1)/227(2), and therefore of PO signal generator 210', is that Vt_210' waveform 229(2) is less sensitive to variation in VDD2 than is Vt_POSG_AA waveform 229(8) of POSG according to the other approach. Another benefit of SVSR load 227(1), and therefore of PO signal generator 210', is that PMOS transistor P1 is moderately sized, and so PO signal generator 210' is smaller than the POSG according to the other approach.

Again, FIG. 2K is a graph of waveforms in accordance with some embodiments. More particularly, FIG. 2K is a graph of waveforms representing threshold voltages of PO signal generators. In FIG. 2K, where VDD2 is the abscissa (X-axis) and threshold voltage for a corresponding PO signal generator is the ordinate (Y-axis).

FIG. 2K includes a waveform 229(9) representing current through NMOS transistor N1 of PO signal generator 210' of FIGS. 2G-2H; a waveform 229(10) representing current through NMOS transistor N1 of PO signal generator 210 of FIG. 2B; and a waveform 229(11) representing current through NMOS transistor N1 (not shown) of the POSG (not shown) according to the other approach.

In FIG. 2K, NMOS transistor N1 is off before time t1, is on during the interval t1 to t3, and is off after time t3. In general, a large current is beneficial when NMOS transistor N1 is ON. Also, in general, a small current (leakage) is beneficial when NMOS transistor N1 is off, e.g., to reduce standby power consumption. As compared to waveforms 229(10) and 229(11), waveform 229(10) strikes a better balance between having a relatively large current when NMOS transistor N1 is ON, and a relatively small current (leakage) when NMOS transistor N1 is off.

Figure 2M:
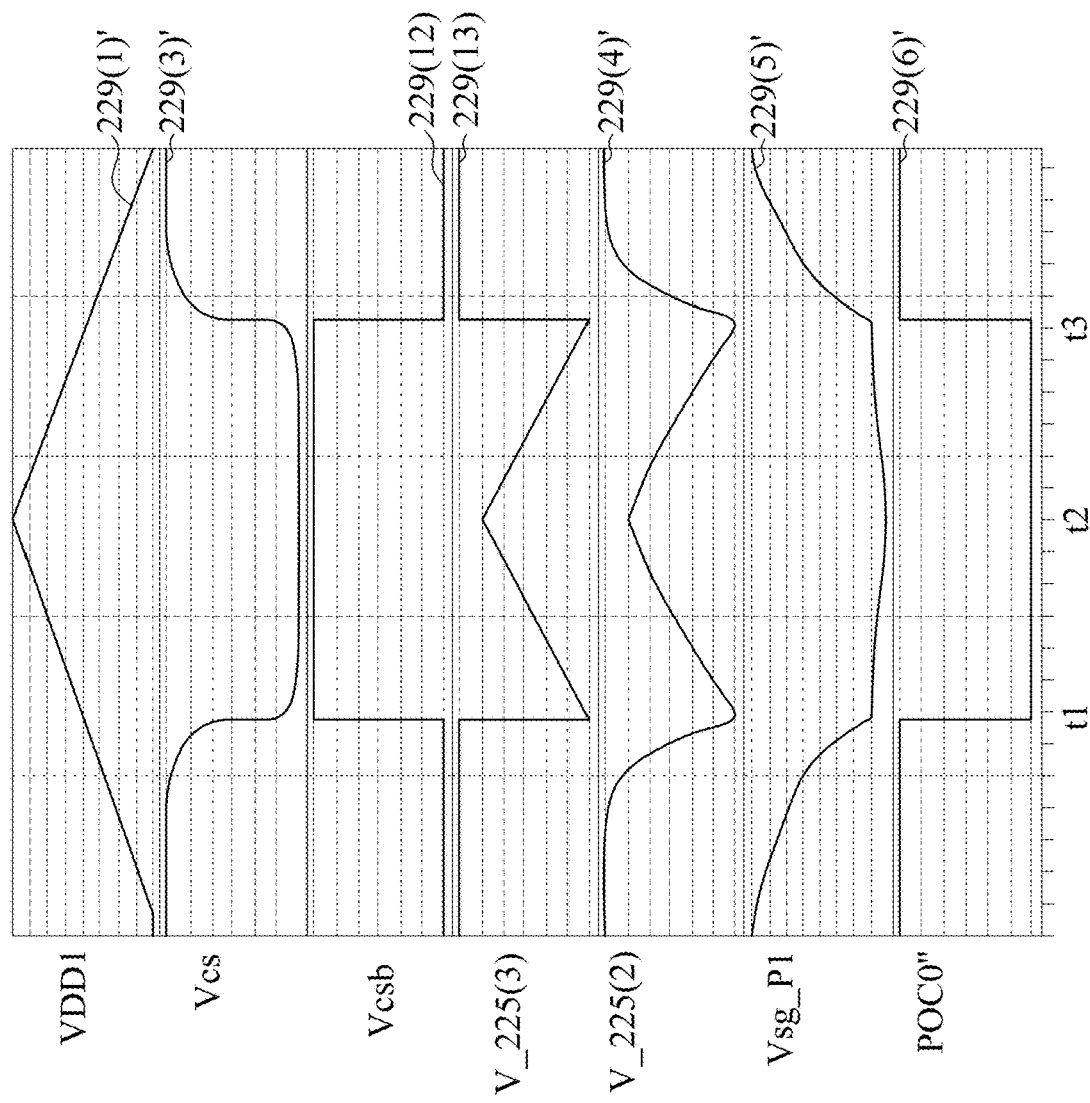
FIGS. 2M-2N are graphs of corresponding waveforms, in accordance with some embodiments.
Figure 2L:
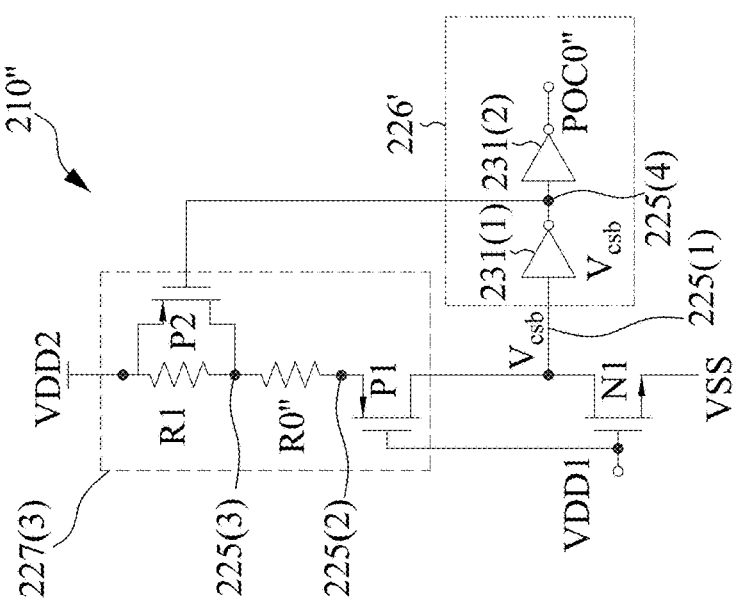
FIG. 2L is a schematic diagram of a PO signal generator, in accordance with some embodiments.
Figure 2N:
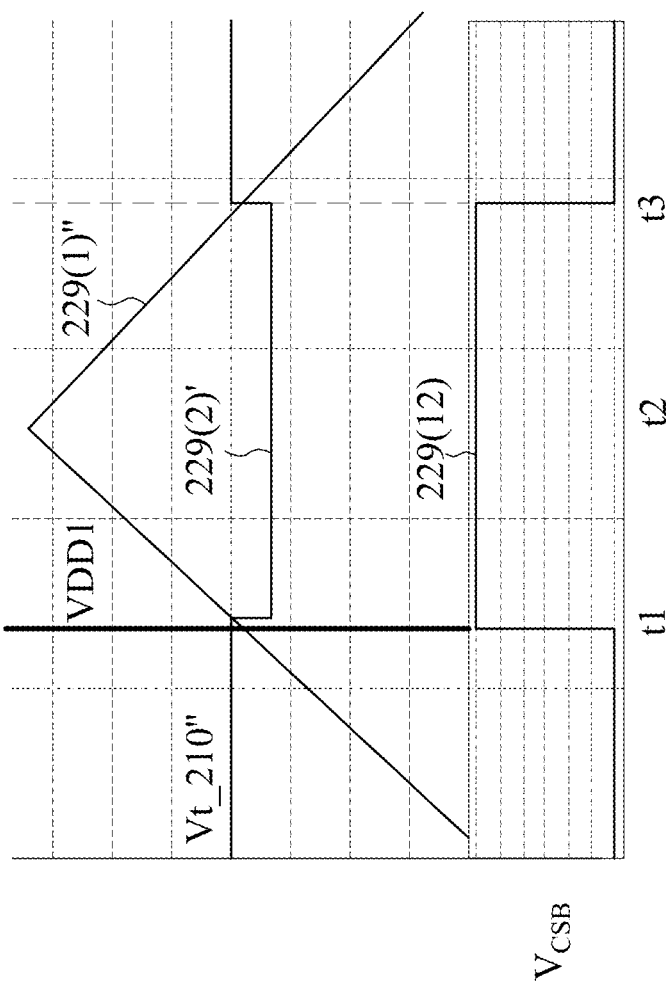

FIG. 2L is a schematic diagram of a power-on control (POC) signal generator 210", in accordance with some embodiments. FIG. 2L shows a different embodiment of POC signal generator 210' of FIG. 2G, as compared to FIG. 2H. FIGS. 2M-2N are graphs of corresponding waveforms, in accordance with some embodiments.

In FIG. 2L, PO signal generator 210" is similar to PO signal generator 210' of FIG. 2H. For brevity, the discussion will focus more on differences between FIGS. 2L-2M and FIGS. 2G-2K than on similarities.

PO signal generator 210" is configured to monitor a state of a voltage VDD1 (monitored voltage VDD1) and correspondingly generate timing signal POC0". As compared to supply-variation sensitivity-reducing (SVSR) load 227(2) of FIG. 2H, SVSR load 227(3) of FIG. 2L includes: a resistor R1 and a PMOS transistor P2 coupled in parallel between first reference voltage VDD2 and a node 225(3); an inverter 231(1) coupled between node 225(1) and a node 225(4); and an inverter 231(2) whose input is coupled to node 225(4) and whose output is provides the timing signal POC0". PMOS transistor P2 serves as a switch to selectively bypass resistor R1.

In FIG. 2L, resistor R0" is coupled between node 225(3) and node 225(2), whereas corresponding resistor R0' in FIG. 2H is coupled between VDD2 and node 225(2). In FIG. 2L, inverters 231(1) and 231(2) are shown as being included in buffer 226'. In FIG. 2L, a voltage 'Vcs bar' (Vcsb) is on node 225(4). In FIG. 2L, the gate electrode of PMOS transistor P2 is configured to receive voltage Vcs_bar.

Again, FIG. 2M is a graph of waveforms in accordance with some embodiments. More particularly, FIG. 2M is a graph of waveforms related to the operation of PO signal generator 210" of FIG. 2L. In FIG. 2M, it is assumed that VDD2 is substantially constant.

FIG. 2M includes: a waveform 229(1)' representing VDD1; a waveform 229(3)' representing Vcs on node 225(1); a waveform 229(12) representing Vcsb on node 225(4); a waveform 229(13) representing a voltage, V_225(3), on node 225(3); a waveform 229(4)' representing a voltage, V_225(2), on node 225(2); a waveform 229(5)' representing Vsg of PMOS transistor P1, Vsg_P1; and a waveform 229(6)' representing timing signal POC0".

In FIG. 2M, when VDD1 waveform 229(1)' is well below the threshold of NMOS transistor N1, Vt_N1, NMOS transistor N1 is turned off, each of Vcs waveform 229(3)', V_225(3) waveform 229(13); V_225(2) waveform 229(4)' and Vsg_P1 waveform 229(5)' is pulled to a logical high value, Vcsb waveform 229(12) is pulled down to a logical low value, and timing signal POC0" is pulled to a logical high value. As such, when VDD1 waveform 229(1)' is well below Vt_N1, the logical low value of Vcsb waveform 229(12) turns on PMOS transistor P2, which places resistor R1 in parallel with a substantially lower resistance (namely, P2). When PMOS transistor P2 is turned ON, resistor R1 is effectively bypassed as most of the current between VDD2 and node 225(3) is shunted through PMOS transistor P1, with a result that the resistance between VDD2 and node 225(2) is substantially R0". Before time t1, when the resistance between VDD2 and node 225(2) is substantially R0", Vt_210" is greater than Vt_N1, such that Vt_N1<Vt_210"{time<t1}.

When VDD1 waveform 229(1)' reaches and rises above Vt_N1 at time t1, NMOS transistor N1 is turning, and each of Vcs waveform 229(3)', V_225(3) waveform 229(13), V225(2) waveform 229(4)' and Vsg_P1 waveform 229(5)' is pulled down to a logical low value, Vcsb waveform 229(12) is pulled up to a logical high value, and timing signal POC0" is pulled down to a logical low value. The transition from a logical high value to a logical low value at time t1 is sharp for timing signal POC0" waveform 229(6)', is substantially sharp for Vcsb wave form 229(12), and, as compared to Vcsb waveform 229(12), progressively more gradual for Vcs waveform 229(3)', V_225(2) waveform 229(4)' and Vsg_P1 waveform 229(5)'. The transition from a logical low value to a logical high value at time t1 of V_225(3) waveform 229(13) is substantially sharp. As such, when VDD1 waveform 229(1)' rises above Vt_N1 at time t1, the logical high value of Vcsb waveform 229(12) turns off PMOS transistor P2, which places resistor R1 in parallel with a substantially higher resistance (namely, P2). When PMOS transistor P2 is turned OF, most of the current between VDD2 and node 225(3) is shunted through resistor R1, with a result that the resistance between VDD2 and node 225(2) is substantially increased to R1+R0". From time t1 to t3, when the resistance between VDD2 and node 225(2) is substantially R1+R0", Vt_210" is substantially equal to Vt_N1, such that Vt_210"{t1≤time<t3}≈Vt_N1.

VDD1 waveform 229(1)' peaks at time t2. Between time t2 and time t3, each of V_225(3) waveform 229(13) and V_225(2) waveform 229(4)' substantially follows VDD1 waveform 229(1)'.

When VDD1 waveform 229(1)' falls below Vt_N1 at time t3, NMOS transistor N1 is turned off, each of Vcs waveform 229(3)', V_225(3) waveform 229(13), V225(2) waveform 229(4)' and Vsg_P1 waveform 229(5)' is pulled up to a logical high value, Vcsb waveform 229(12) is pulled down to a logical low value, and timing signal POC0" is pulled up to a logical high value. The transition from a logical low value to a logical high value at time t3 is sharp for timing signal POC0" waveform 229(6)', is substantially sharp for Vcsb waveform 229(12), and, as compared to Vcsb waveform 229(12), progressively more gradual for Vcs waveform 229(3)', V_225(2) waveform 229(4)' and Vsg_P1 waveform 229(5)'. The transition from a logical high value to a logical low value at time t3 of V_225(3) waveform 229(13) is substantially sharp. After time t3, when the resistance between VDD2 and node 225(2) is substantially R0", Vt_210" is greater than Vt_N1, such that Vt_N1<Vt_210"{t3≤time}.

The differing values of Vt_210" over time, namely Vt_210"{time<t1}, Vt_210"{t1≤time<t3}, and Vt_210"{t3≤time}, represent hysteresis in Vt_210", as shown in FIG. 2N.

Again, FIG. 2N is a graph of waveforms in accordance with some embodiments. More particularly, FIG. 2N is a graph of waveforms related to the operation of PO signal generator 210" of FIG. 2K. In FIG. 2N, it is assumed that VDD2 is substantially constant.

FIG. 2N includes: a waveform 229(1)' representing VDD1; a waveform 229(12) representing Vcsb on node 225(4); a waveform 229(2)' representing Vt_210".

In FIG. 2N, Vt_210" waveform 229(2)' shows hysteresis. In particular, the values Vt_210"{time<t1} and Vt_210"{t3≤time} are substantially the same and will be referred to as Vt_210"{time<t1 and t3≤time}. However, Vt_210"{t1≤time<t3} is less than Vt_210"{time<t1 and t3≤time}, which represents hysteresis.

In some embodiments in which it is assumed that VDD2 is substantially constant, Vt_210"{t1≤time<t3} is about 0.349 volts, and Vt_210"{time<t1 and t3≤time} is about 0.383 volts.

A benefit of SVSR load 227(3), and therefore of PO signal generator 210", is that Vt_210" waveform 229(2)' is less sensitive to variation in VDD2 than Vt_210' of FIGS. 2G-2H, and therefore even less sensitive to variation in VDD2 than is Vt_POSG_AA of the other approach.

Figure 3A:
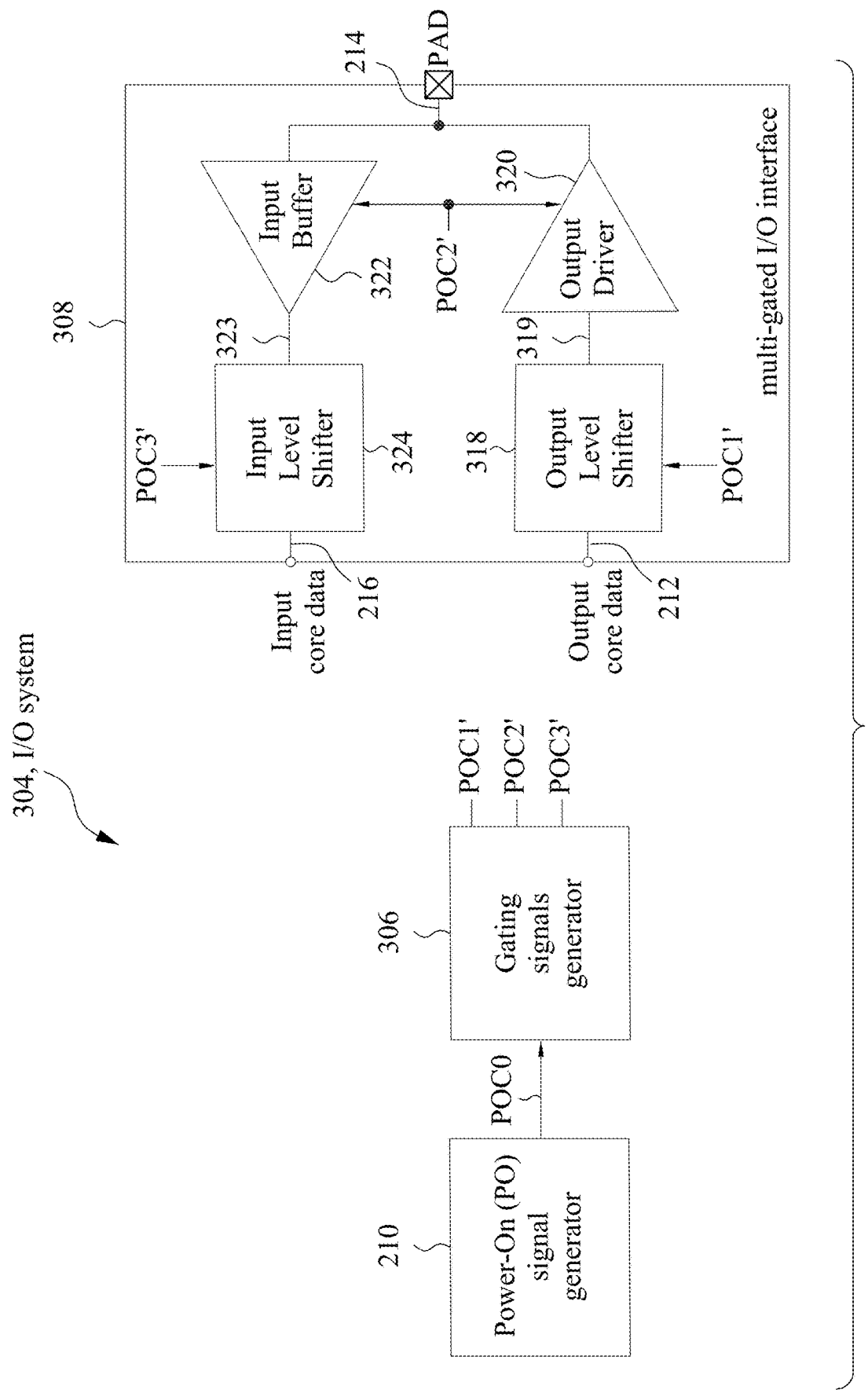
FIG. 3A is a schematic diagram of an I/O system, in accordance with some embodiments.
Figure 3B:
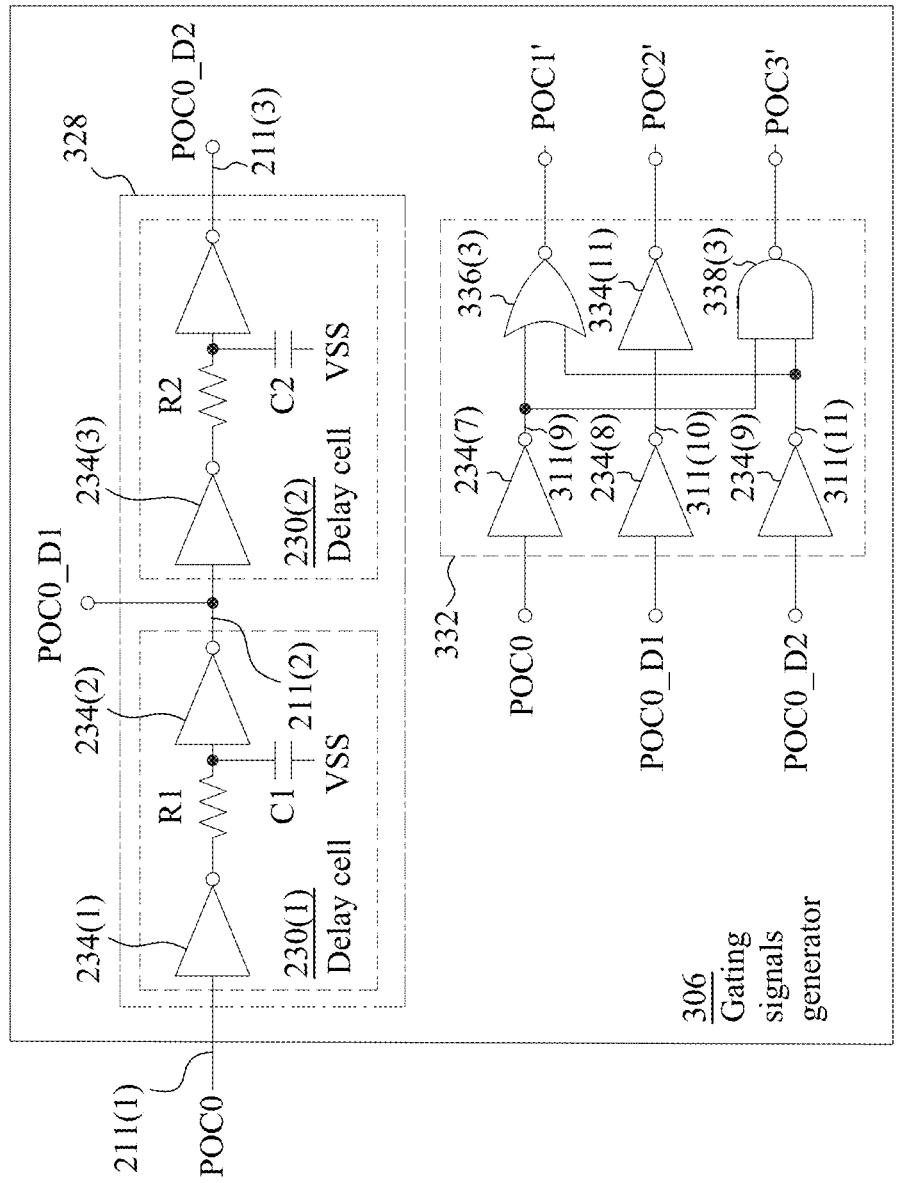
FIG. 3B is a schematic diagram of gating signals generator, in accordance with some embodiments.
Figure 3C:
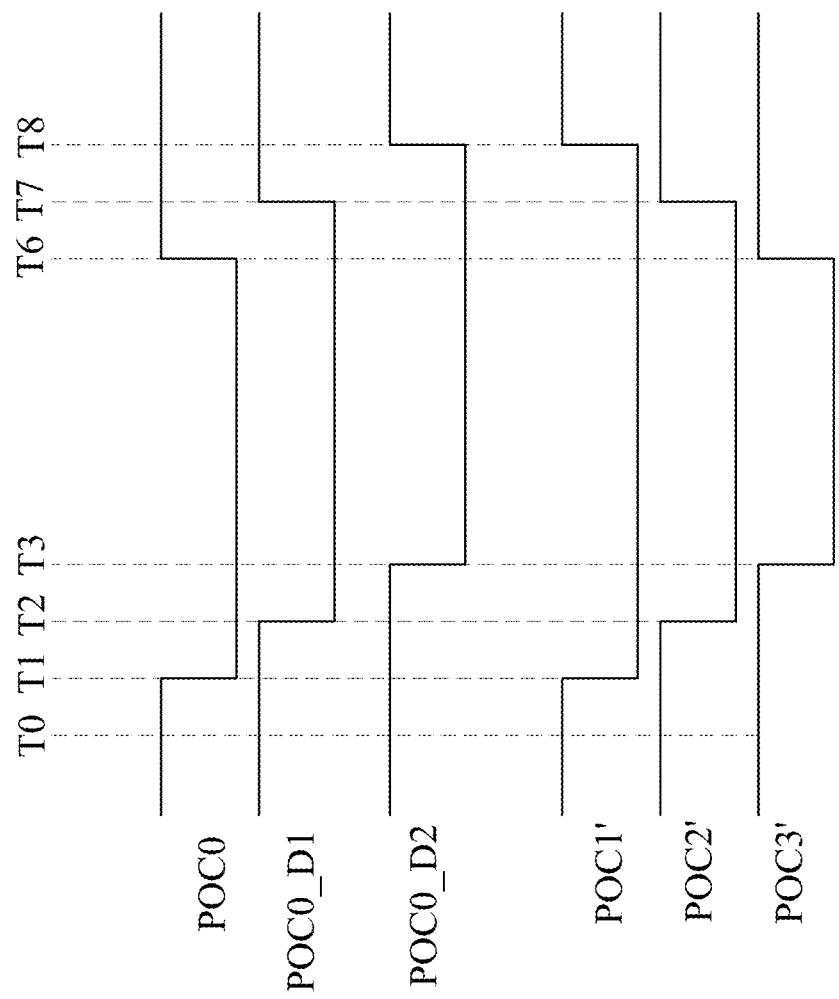
FIG. 3C is a graph of waveforms, in accordance with some embodiments.

FIG. 3A is a schematic diagram of an I/O system 304, in accordance with some embodiments. FIG. 3B is a schematic diagram showing gating signals generator 306 in more detail, in accordance with some embodiments. FIG. 3C is a graph of waveforms, in accordance with some embodiments.

System 304 of FIG. 3A reflect a scenario in which a glitch on output path and a glitch on the input path are prevented. In some embodiments, as compared with system 204 of FIG. 2A, system 304 of FIG. 3A is less complex. In some embodiments, as compared with system 204 of FIG. 2A, system 304 of FIG. 3A consumes a smaller area (has a smaller footprint).

FIGS. 3A-3C follow a numbering convention similar to that of FIGS. 2A-2F, albeit with FIGS. 3A-3C using 3-series numbering to introduce new elements whereas FIGS. 2A-2F use 2-series numbering. Elements in FIGS. 3A-3C carried over from FIGS. 2A-2F continue to use the 2-series numbing of FIGS. 2A-2F. For brevity, the discussion will focus more on differences between FIGS. 3A-3C and FIGS. 2A-2F than on similarities.

I/O system 304 includes: PO signal generator 210; a gating signals generator 306; and a multi-gated I/O interface 308. Gating signals generator 306 differs from gating signals generator 206 in that gating signals generator 306 generates gating signals POC1', POC2' and POC3' but not gating signal POC4.

Accordingly, multi-gated I/O interface 308 is configured to receive gating signals POC1', POC2' and POC3' but not gating signal POC4. Multi-gated I/O interface 308 includes: an output level shifter 318 coupled between output terminal 212 and a node 319; an output driver 320 coupled between node 319 and external terminal 214; an input buffer 322 coupled between external terminal 214 and a node 323; and an input level shifter 324 coupled between node 323 and input node of 216.

More particularly, multi-gated I/O interface 308 is configured to receive gating signals POC1', POC2' and POC3' (but not gating signal POC4) as follows: output level shifter 318 is configured to receive gating signal POC1' as an enablement signal; output driver 320 and input buffer 322 are configured correspondingly to receive gating signal POC2' as an enablement signal; and input level shifter 324 is configured to receive gating signal POC3' as an enablement signal. See, e.g., FIG. 3C for the relative timing of gating signals POC1', POC2' and POC3'.

FIG. 3B is a schematic diagram showing gating signals generator 306 in more detail, in accordance with some embodiments.

Gating signals generator 306 includes a delay chain 328 and a logic circuit 332. Delay chain 328 differs from delay chain 228 in that delay chain 328 includes delay cell 230(1) and 230(2) but not delay cell 230(3).

Logic circuit 332 differs from logic circuit 232 in several ways. The differences include the following. Logic circuit 332 includes: inverters 234(7)-234(9) but not inverter 234 (10); NOR gate 336(3) but not NOR gates 236(1) and 236(2); an inverter 334(11) instead of NAND gate 238(1); and NAND gate 338(3) instead of NAND gate 238(2). Also, logic circuit 332 does not include NAND gate 238(2). Inverter 234(7) provides POC0_bar timing signal on a node 311(9) in FIG. 3B. Inverter 234(8) provides POC0_D1_bar timing signal on a node 311(10) in FIG. 3B; and inverter 234(9) provides POC0_D2_bar timing signal on a node 311(11) in FIG. 3B.

In FIG. 3B, NOR gate 336(3) receives timing signal POC0_bar and timing signal POC0_D2_bar and generates gating signal POC1'. As NOR gate 336(3) receives different inputs than corresponding NOR gate 236(1), the output of NOR gate 336(3) is referred to as gating signal POC1' rather than gating signal POC1. Inverter 334(11) receives timing signal POC0_D1_bar and generates gating signal POC2'. As inverter 334(11) of FIG. 3B replaces corresponding NOR gate 236(2) of FIG. 2E, the output of inverter 334(11) is referred to as gating signal POC2' rather than gating signal POC2. NAND gate 338(3) receives timing signal POC0_bar and timing signal POC0_D2_bar and generates gating signal POC3'. As NAND gate 338(3) receives different inputs than corresponding NAND gate 238(1), the output of NAND gate 338(3) is referred to as gating signal POC3' rather than gating signal POC3.

FIG. 3C is a graph of waveforms, in accordance with some embodiments.

More particularly, FIG. 3C is a graph of waveforms representing timing signal POC0, timing signal POC0_D1 and timing signal POC0_D2 but not timing signal POC0_D3, as well as gating signal POC1', gating signal POC2' and gating signal POC3 but not gating signal POC4, each of which has a logical high value (or 'logical one' value) at a time T0.

At a time T1, timing signal POC0 and gating signal POC1' transition to a logical low value (or 'logical zero' value), with a result that gating signal POC1' enables output level shifter 318 of FIG. 3A.

At a time T2, which is after the output of output level shifter 318 has stabilized, timing signal POC0_D1 and gating signal POC2' transition to a logical low value, with a result that gating signal POC2' enables output driver 320 and input buffer 322 of FIG. 3A.

At a time T3, timing signal POC0_D2 and gating signal POC3' transition to a logical low value, with a result that gating signal POC3' enables input level shifter 324 of FIG. 3A. In some embodiments, the time T3 is after the PAD signal on terminal 214 has stabilized. In some embodiments, the time T3 is after the output of input buffer 322 has stabilized.

At a time T6, timing signal POC0 and gating signal POC3' transition to a logical high value (or 'logical high' value), with a result that gating signal POC3' disables input level shifter 324. At a time T7, timing signal POC0_D1 and gating signal POC2' transition to a logical high value, with a result that gating signal POC2' disables output driver 320 and input buffer 322. At a time T8, timing signal POC0_D2 and gating signal POC1' transition to a logical high value, with a result that gating signal POC1' disables output level shifter 318.

In at least some embodiments, I/O system 304 avoids the first glitching issue suffered by the other approach because gating signals generator 306 is configured to enable output level shifter 318 with gating signal POC1', wait for an output signal of output level shifter 318 to stabilize, and then enable output driver 320 with gating signal POC2'. In at least some embodiments, I/O system 304 avoids the second glitching issue suffered by the other approach because gating signals generator 306 is configured to enable input buffer 322 with gating signal POC2', wait for the output signal of input buffer 322 to stabilize, and then enable input level shifter 324 with gating signal POC3'.

In FIG. 3C, according to some embodiments, the cascaded transitions of gating signals POC1', POC2' and POC3' at corresponding times T1, T2 and T3 assume a circumstance in which components (not shown) in the core (not shown, but see core region 102 FIG. 1) are ready for I/O exchange with I/O system 304. Also in FIG. 3C, according to some embodiments, the cascaded transitions of gating signals POC3', POC2' and POC1' at corresponding times T6, T7 and T8 assume a circumstance in which components (not shown) in the core (not shown, but see core region 102 FIG. 1) are not ready for I/O exchange with I/O system 304.

Figure 4A:
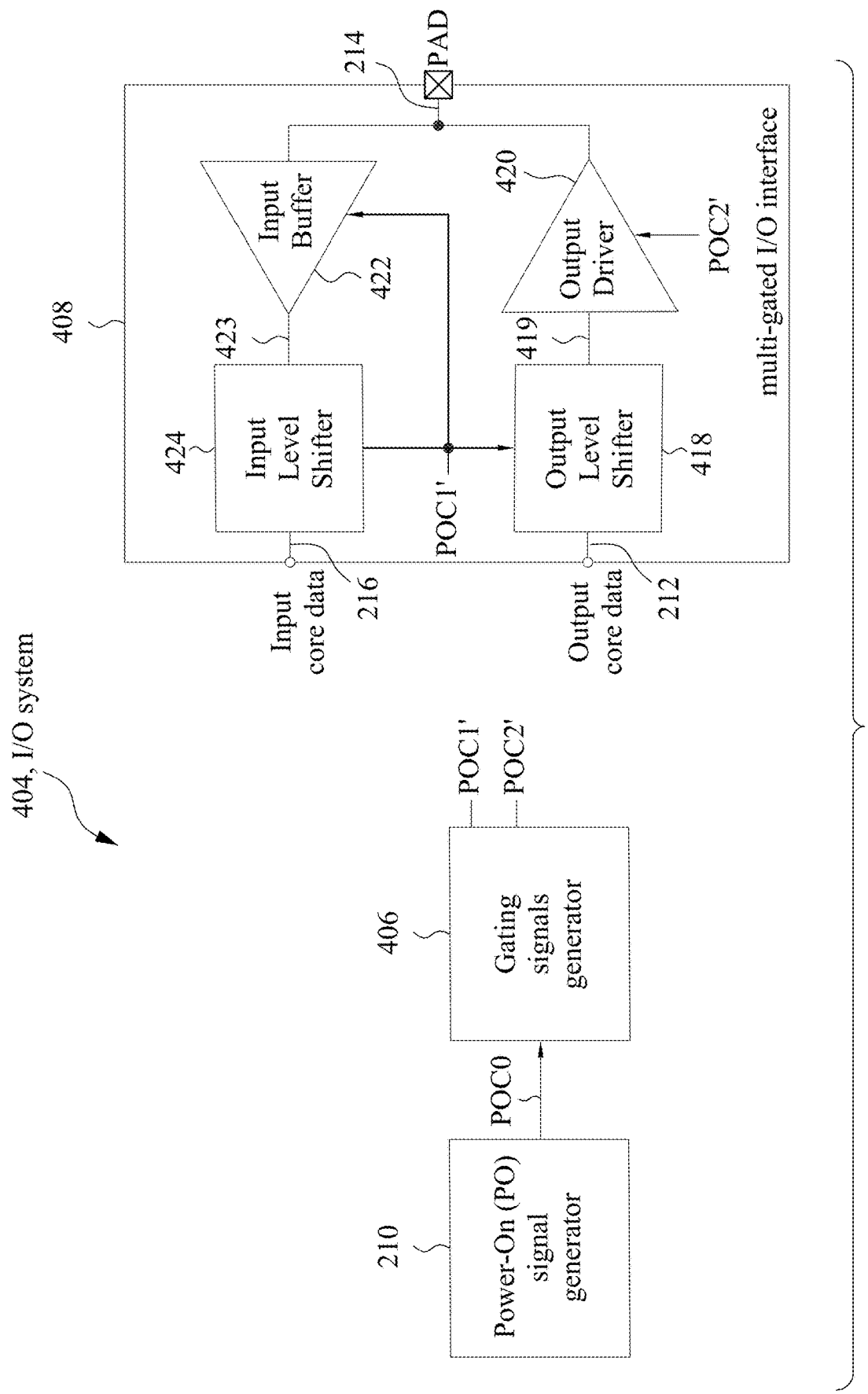
FIG. 4A is a schematic diagram of an I/O system, in accordance with some embodiments.

FIG. 4A is a schematic diagram of an I/O system 404, in accordance with some embodiments. FIG. 4B is a schematic diagram showing gating signals generator 406 in more detail, in accordance with some embodiments. FIG. 4C is a graph of waveforms, in accordance with some embodiments. FIG. 4D is a graph of waveforms, in accordance with some embodiments.

System 404 of FIG. 4A reflects a scenario in which prevention of a glitch on the output path is the focus rather than prevention of glitches on both the input path and the output path. In some embodiments, as compared system 204 of FIG. 2A or system 304 of FIG. 3A, system 404 of FIG. 4A is less complex. In some embodiments, as compared system 204 of FIG. 2A or system 304 of FIG. 3A, system 404 of FIG. 4A consumes a smaller area (has a smaller footprint).

FIGS. 4A-4D follow a numbering convention similar to that of FIGS. 3A-3C, albeit with FIGS. 4A-4D using 4-series numbering to introduce new elements whereas FIGS. 3A-3C use 3-series numbering. Elements in FIGS. 4A-4D carried over from FIGS. 2A-2F continue to use the 2-series numbing of FIGS. 2A-2F. Elements in FIGS. 4A-4D carried over from FIGS. 3A-3C continue to use the 3-series numbing of FIGS. 3A-3C. For brevity, the discussion will focus more on differences between FIGS. 4A-4D and FIGS. 3A-3C than on similarities.

I/O system 404 includes: PO signal generator 210; a gating signals generator 406; and a multi-gated I/O interface 408. Gating signals generator 406 differs from gating signals generator 306 in that gating signals generator 306 generates gating signals POC1' and POC2' but not gating signal POC3'.

Accordingly, multi-gated I/O interface 408 is configured to receive to gating signals POC1' and POC2' but not gating signal POC3'. Multi-gated I/O interface 408 includes: an output level shifter 418 coupled between output terminal 212 and a node 419; an output driver 420 coupled between node 419 and external terminal 214; an input buffer 422 coupled between external terminal 214 and a node 423; and an input level shifter 424 coupled between node 423 and input node of 216.

More particularly, multi-gated I/O interface 408 is configured to receive gating signals POC1' and POC2' (but not gating signal POC3') as follows: output level shifter 418, input buffer 422, and input level shifter 424 are configured to receive gating signal POC1' as an enablement signal; and output driver 420 is configured to receive gating signal POC2' as an enablement signal. See, e.g., FIGS. 4C-4D for the relative timing of gating signals POC1' and POC2'.

FIG. 4B is a schematic diagram showing gating signals generator 406 in more detail, in accordance with some embodiments.

Gating signals generator 406 includes delay chain 328 and a logic circuit 432. Logic circuit 432 differs from logic circuit 332 does not include NAND gate 338(3).

FIG. 4C is a graph of waveforms, in accordance with some embodiments.

More particularly, FIG. 4C is a graph of waveforms representing gating signal POC1' and gating signal POC2', but not timing signal POC0, nor timing signal POC0_D1, nor timing signal POC0_D2, nor gating signal POC3'. Each of gating signal POC1' and gating signal POC2' has a logical high value (or 'logical one' value) at a time T0.

At a time T1, gating signal POC1' transitions to a logical low value (or 'logical zero' value), with a result that gating signal POC1' enables output level shifter 418, input buffer 422 and input level shifter 424 of FIG. 4A.

At a time T2, which is after the output of output level shifter 418 has stabilized, gating signal POC2' transitions to a logical low value, with a result that gating signal POC2' enables output driver 420 of FIG. 4A.

At a time T7, gating signal POC2' transitions to a logical high value (or 'logical one' value), with a result that gating signal POC2' disables output driver 420. At a time T8, gating signal POC1' transitions to a logical high value, with a result that gating signal POC1' disables output level shifter 418, input buffer 422 and input level shifter 424.

FIG. 4D is a graph of waveforms, in accordance with some embodiments.

More particularly, FIG. 4D shows waveforms representing PAD signal 442 on external terminal 214 of FIG. 4A, an output core data signal 443 on output terminal 212 of FIG. 4A, an enable signal 444 for output driver 420 of FIG. 4A, gating signal POC1' waveform 445 and gating signal POC2' waveform 446. In some embodiments, enable signal 444 is based on gating signal POC2' waveform 446. In some embodiments, enable signal 444 is generated by one or more components (not shown) which are included in output driver 420.

Each of PAD signal 442, gating signal POC1' waveform 445 and gating signal POC2' waveform 446 has a logical high value (or 'logical one' value) at a time T40. Each of output core data signal 443 and enable signal 444 for output driver 420 of FIG. 4A has a logical low value (or 'logical zero' value) at a time T40. At a time T41, gating signal POC1' waveform 445 transitions to a logical low value, with a result that gating signal POC1' waveform 445 enables output level shifter 418, and also enables input buffer 422 and input level shifter 424.

Also at time T41: output core data signal 443 begins a slow transition 447 from the logical low value to the logical high value, reaching the logical high value at T42; and gating signal POC2' waveform 446 remains at the logical high value, which prevents PAD signal 442 from otherwise experiencing a glitch 448. As glitch 448 does not actually occur, glitch 448 is shown with phantom (dashed) lines. Glitch 448 is represented by PAD signal 442 otherwise transitioning to the logical low value at time T41 and then returning to the logical high value at time T42.

More particularly, at time T41, by remaining at the logical high value, gating signal POC2' waveform 446 continues to disable output driver 420 and thereby prevents enable signal 444 for output driver 420 from following slow transition 447 from the logical low value to the logical high value of output core data signal 443 during T41-T42. If output driver 420 otherwise was enabled at time T41 so that enable signal 444 for output driver 420 instead followed slow transition 447 (again, from the logical low value to the logical high value of output core data signal 443 during T41-T42), then PAD signal 442 otherwise would experience glitch 448.

At a time T43, which is after output core data 443 has stabilized and thus after the output signal (not shown) of output level shifter 418 has stabilized, gating signal POC2' waveform 446 transitions to a logical low value, with a result that gating signal POC2' waveform 446 enables output driver 420. As such and in at least some embodiments, I/O system 404 avoids the first glitching issue suffered by the other approach because gating signals generator 406 is configured to enable output level shifter 418 with gating signal POC1' waveform 445, wait for the output signal (not shown) of output level shifter 418 to stabilize, and then enable output driver 420 with gating signal POC2' waveform 446.

In FIG. 4C, according to some embodiments, the cascaded transitions of gating signals POC1' and POC2' at corresponding times T1 and T2 assume a circumstance in which components (not shown) in the core (not shown, but see core region 102 FIG. 1) are ready for I/O exchange with I/O system 404. Also in FIG. 4C, according to some embodiments, the cascaded transitions of gating signals POC2 and POC1 at corresponding times T7 and T8 assume a circumstance in which components (not shown) in the core (not shown, but see core region 102 FIG. 1) are not ready for I/O exchange with I/O system 404.

Figure 5A:
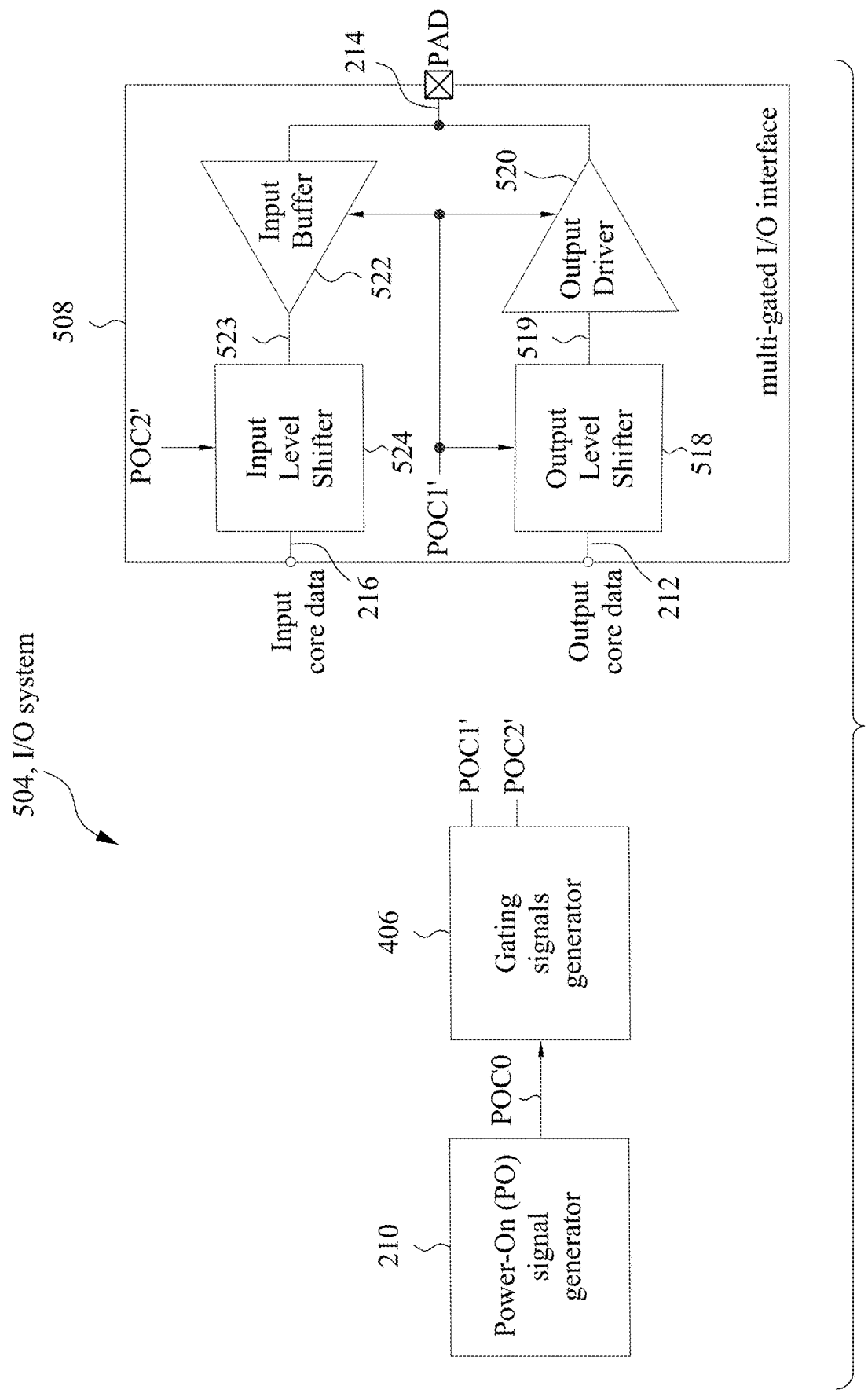
FIG. 5A is a schematic diagram of an I/O system, in accordance with some embodiments.
Figure 5B:
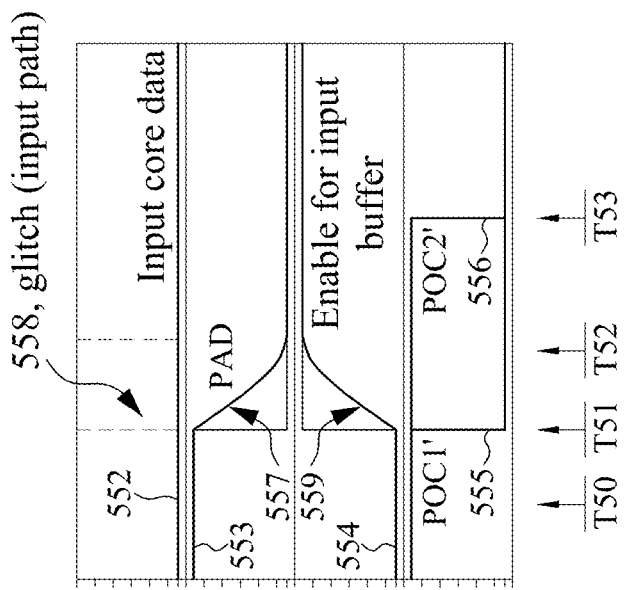
FIG. 5B is a graph of waveforms, in accordance with some embodiments.

FIG. 5A is a schematic diagram of an I/O system 504, in accordance with some embodiments. FIG. 5B is a graph of waveforms, in accordance with some embodiments.

The embodiments of FIGS. 5A-5B reflect a scenario in which prevention of a glitch on the input path is the focus rather than prevention of glitches on both the input path and the output path. In some embodiments, as compared system 204 of FIG. 2A or system 304 of FIG. 3A, system 504 of FIG. 5A is less complex. In some embodiments, as compared system 204 of FIG. 2A or system 304 of FIG. 3A, system 504 of FIG. 5A consumes a smaller area (has a smaller footprint).

FIGS. 5A-5B follow a numbering convention similar to that of FIGS. 4A-4D, albeit with FIGS. 5A-5B using 5-series numbering to introduce new elements whereas FIGS. 4A-4C use 4-series numbering. Elements in FIGS. 5A-5B carried over from FIGS. 2A-2F continue to use the 2-series numbing of FIGS. 2A-2F. Elements in FIGS. 5A-5B carried over from FIGS. 4A-4D continue to use the 4-series numbing of FIGS. 4A-4D. For brevity, the discussion will focus more on differences between FIGS. 5A-5B and FIGS. 4A-4D than on similarities.

I/O system 504 includes: PO signal generator 210; gating signals generator 406; and a multi-gated I/O interface 508. Multi-gated I/O interface 508 includes: an output level shifter 518 coupled between output terminal 212 and a node 519; an output driver 520 coupled between node 519 and external terminal 214; an input buffer 522 coupled between external terminal 214 and a node 523; and an input level shifter 524 coupled between node 523 and input node of 216.

More particularly, multi-gated I/O interface 508 is configured to receive gating signals POC1' and POC2' as follows: output level shifter 518, output driver 520 and input buffer 522 are configured to receive gating signal POC1' as an enablement signal; and input level shifter 524 is configured to receive gating signal POC2' as an enablement signal. See, e.g., FIG. 5B for the relative timing of gating signals POC1' and POC2'.

FIG. 5B is a graph of waveforms, in accordance with some embodiments.

More particularly, FIG. 5B is a graph of waveforms representing an input core data signal 552 on input terminal 216 of FIG. 5A which represents an output signal of input level shifter 524, PAD signal 553 on external terminal 214 of FIG. 5A, an enable signal 554 for input buffer 522, gating signal POC1' waveform 555 and gating signal POC2' waveform 556. In some embodiments, enable signal 554 is based on gating signal POC1' waveform 555. In some embodiments, enable signal 554 is generated by one or more components (not shown) which are included in input buffer 522.

Each of PAD signal 553, gating signal POC1' waveform 555 and gating signal POC2' waveform 556 has a logical high value (or 'logical one' value) at a time T50. Each of input core data signal 552, and enable signal 554 for input buffer 522 has a logical low value (or 'logical zero' value) at a time T50.

At a time T51, gating signal POC1' waveform 555 transitions to a logical low value, with a result that gating signal POC1' waveform 555 enables input buffer 522, and also enables output level shifter 518 and output driver 520. Also at time T51: PAD signal 553 begins a slow transition 557 from the logical high value to the logical low value, reaching the logical low value at time T52; enable signal 554 for input buffer 522 begins a slow transition 559 from the logical low value to the logical high value, reaching the logical high value at time T52; and gating signal POC2' waveform 556 remains at the logical high value, which prevents input core data signal 552 from otherwise experiencing a glitch 558. As glitch 558 does not actually occur, glitch 558 is shown with phantom (dashed) lines. Glitch 558 is represented by input core data signal 552 otherwise transitioning to the logical high value at time T51 and then returning to the logical low value at time T52.

More particularly, at time T51, by remaining at the logical high value, gating signal POC2' waveform 556 continues to disable input level shifter 524 and thereby prevents enable signal 554 for input buffer 522 from following slow transition 557 of PAD signal 553 during T51-T52. If input buffer 522 otherwise was enabled at time T51 so that enable signal 554 for input buffer 522 instead followed slow transition 557 (again, from the logical low value to the logical high value) of PAD signal 553 during T51-T52, then input core data signal 552 otherwise would experience glitch 558. At a time T53, which is after PAD signal 553 has stabilized and thus after enable signal 554 for input buffer 522 has stabilized, gating signal POC2' waveform 556 transitions to a logical low value, with a result that gating signal POC2' waveform 556 enables input level shifter 524. As such, a benefit of I/O system 504 is that it avoids the second glitching issue suffered by the other approach because gating signals generator 406 is configured to enable input buffer 522 with gating signal POC1' waveform 555, wait for output signal (not shown) of input buffer 522 to stabilize, and then enable input level shifter 524 with gating signal POC2' waveform 556.

Figure 6A:
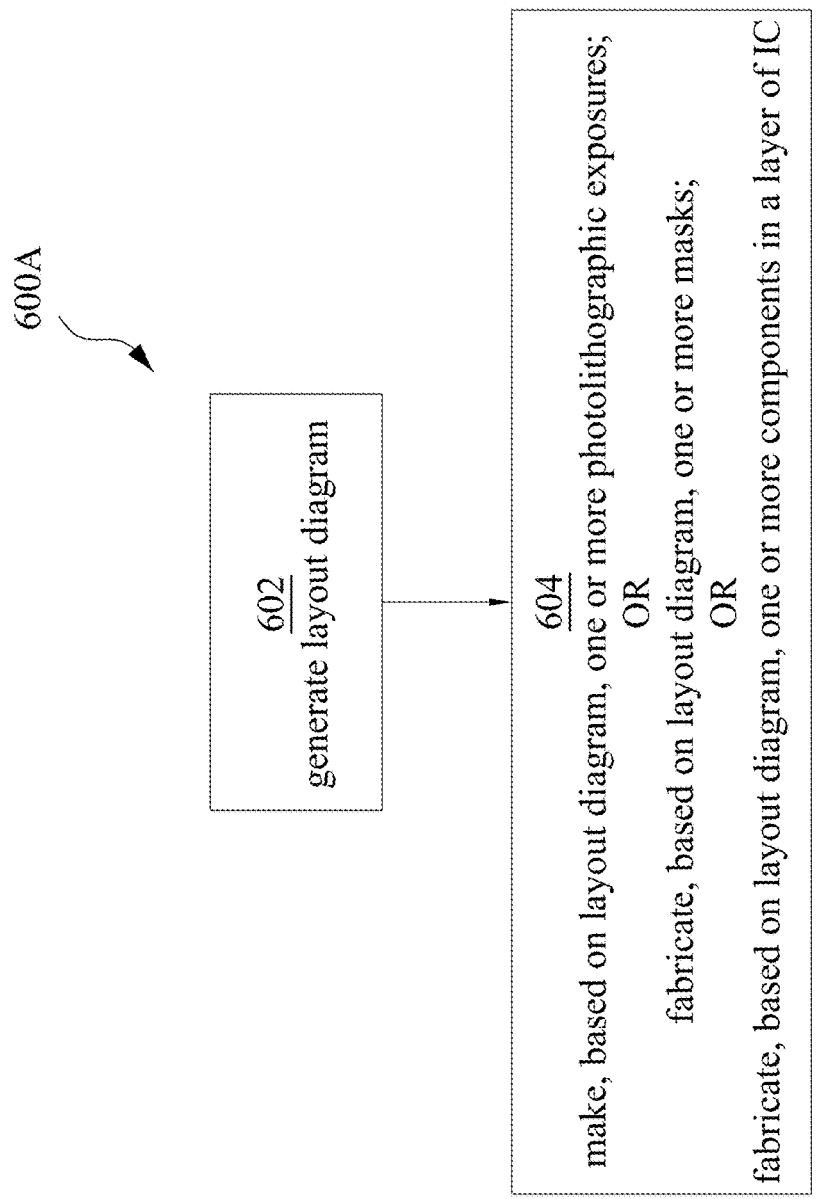
FIG. 6A is a flowchart of a method of manufacturing a semiconductor device, in accordance with some embodiments.

FIG. 6A is a flowchart of a method 600A of generating a layout diagram, in accordance with some embodiments.

In some embodiments, method 600A is used to generate a layout diagram corresponding to I/O system 104 of FIG. 1. An example of a semiconductor device which can be manufactured according to method 600A includes semiconductor device 100 of FIG. 1.

Method 600A is implementable, for example, using EDA system 700 (FIG. 7, discussed below) and an integrated circuit (IC), manufacturing system 800 (FIG. 8), discussed below), in accordance with some embodiments. Regarding method 600, examples of the layout diagram include layout diagrams corresponding to the semiconductor devices disclosed herein, or the like.

In FIG. 6A, method 600A includes blocks 602-604. At block 602, a layout diagram is generated which, among other things, includes an I/O system corresponding to I/O system region 104, I/O system 204, I/O system 304, I/O system 404, I/O system 504, or the like. An example of a semiconductor device corresponding to a layout generated by method 600A includes semiconductor device 100 of FIG. 1. Block 602 is implementable, for example, using EDA system 700 (FIG. 7, discussed below), in accordance with some embodiments. From block 602, flow proceeds to block 604.

At block 604, based on the layout diagram, at least one of (A) one or more photolithographic exposures are made or (B) one or more semiconductor masks are fabricated or (C) one or more components in a layer of a semiconductor device are fabricated. See discussion below of FIG. 8.

Figure 6B:
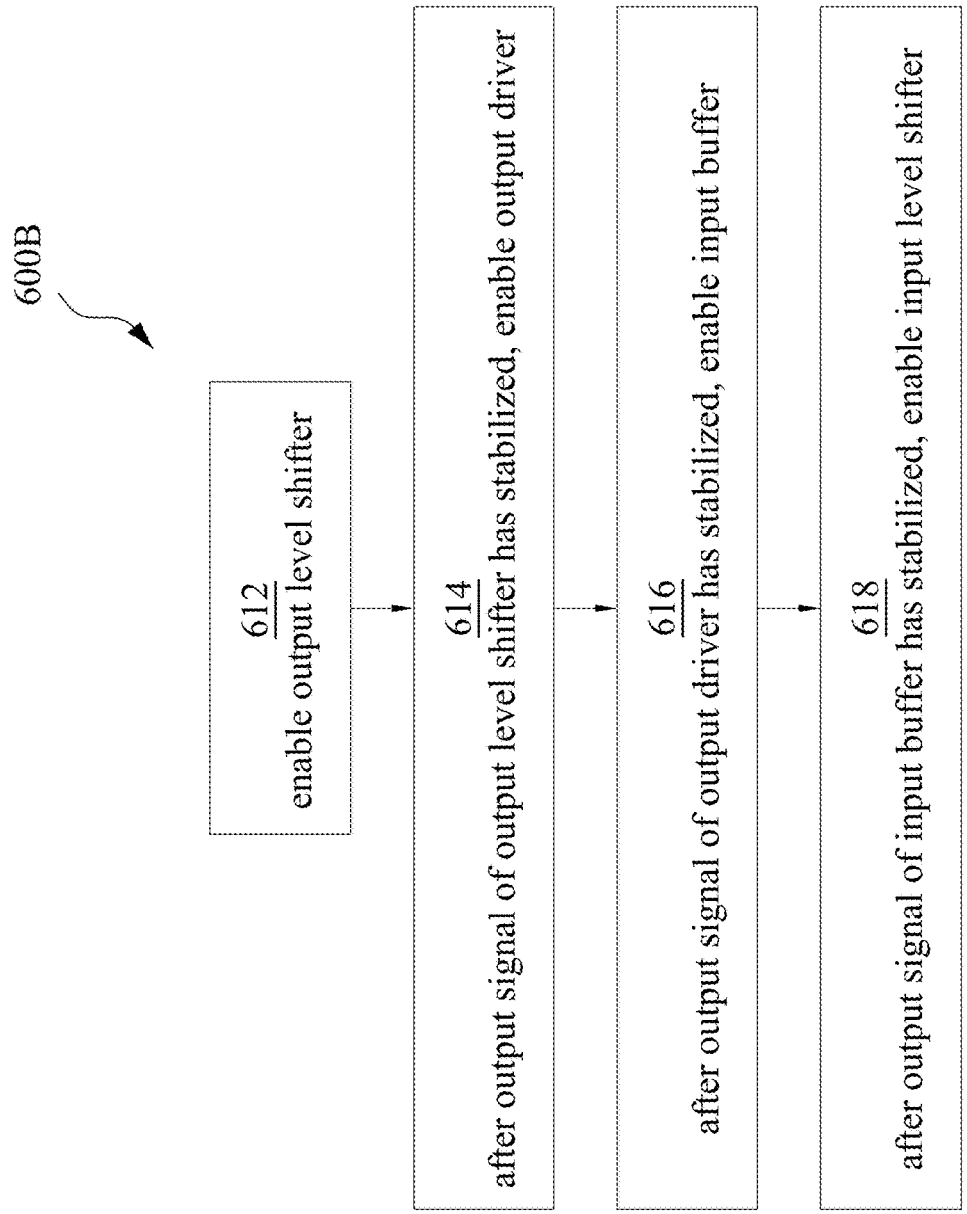
FIGS. 6B-6E are corresponding flowcharts of corresponding methods of generating gating signals for a multi-gated I/O system, in accordance with some embodiments.

FIG. 6B is a flowchart of a method 600B of generating gating signals for a multi-gated I/O system, in accordance with some embodiments.

Examples of the multi-gated I/O system for which method 600B generates gating signals include I/O system 204 of FIG. 2A, or the like.

In FIG. 6B, method 600B includes blocks 612-618. At block 612, an output level shifter is enabled. Examples of the output level shifter include output level shifter 218 of FIG. 2A, or the like. Examples of enabling the output level shifter include the transition of gating signal POC1 at time T1 in FIG. 2F, or the like. From block 612, flow proceeds to block 614.

At block 614, after the output signal of the output level shifter has stabilized, an output driver is enabled. Examples of the output driver include output driver 220 of FIG. 2A, or the like. Examples of enabling the output driver include the transition of gating signal POC2 at time T2 in FIG. 2F, or the like. From block 614, flow proceeds to block 616.

At block 616, after the output signal of the output driver has stabilized, an input buffer is enabled. Examples of the input buffer include input buffer 222 of FIG. 2A, or the like. Examples of enabling the input buffer include the transition of gating signal POC3 at time T3 in FIG. 2F, or the like. From block 616, flow proceeds to block 618.

At block 618, after the output signal of the input buffer has stabilized, the input level shifter is enabled. Examples of the input level shifter include input level shifter 224 of FIG. 2A, or the like. Examples of enabling the input level shifter include the transition of gating signal POC4 at time T4 in FIG. 2F, or the like.

Figure 6C:
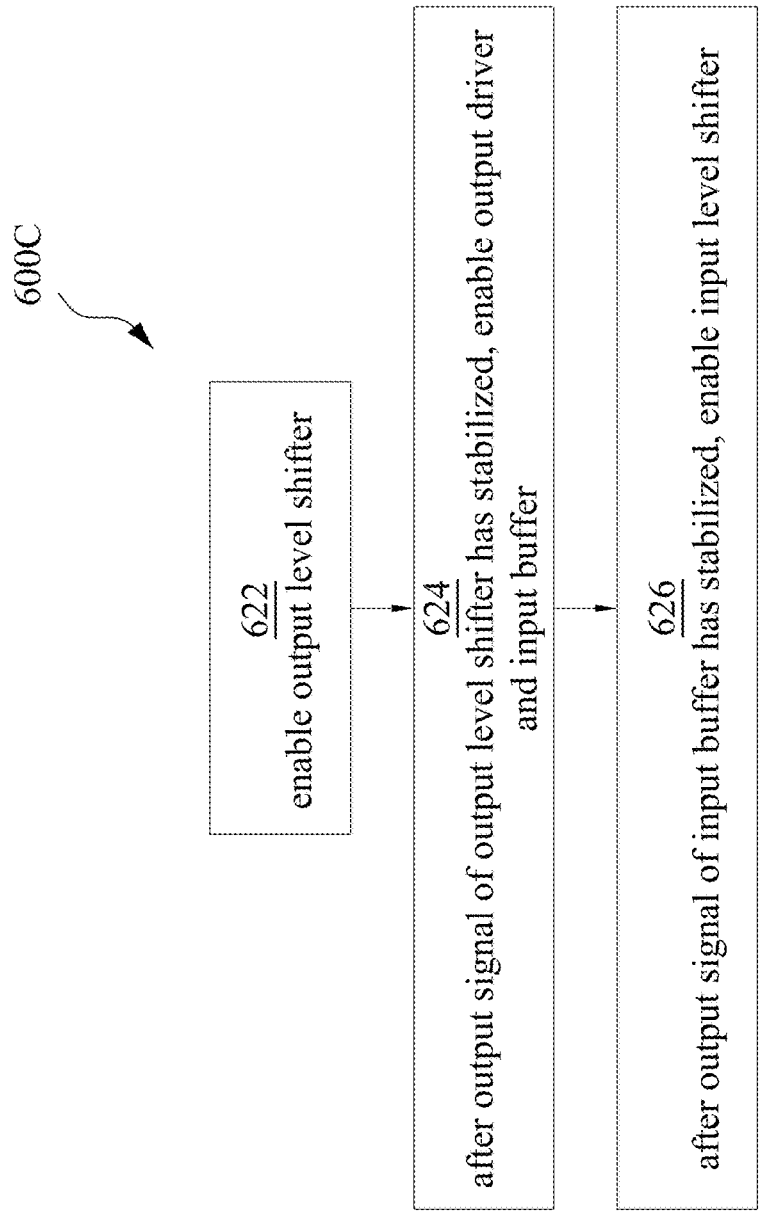

FIG. 6C is a flowchart of a method 600C of generating gating signals for a multi-gated I/O system, in accordance with some embodiments.

Examples of the multi-gated I/O system for which method 600C generates gating signals include 304 of FIG. 3A, or the like.

In FIG. 6C, method 600C includes blocks 622-626. At block 622, an output level shifter is enabled. Examples of the output level shifter include output level shifter 318 of FIG. 3A, or the like. Examples of enabling the output level shifter include the transition of gating signal POC1' at time T1 in FIG. 3C or the like. From block 622, flow proceeds to block 624.

At block 624, after the output signal of the output level shifter has stabilized, an output driver and an input buffer are enabled. Examples of the output driver include output driver 320 of FIG. 3A, or the like. Examples of the input buffer include input buffer 322 of FIG. 3A, or the like. Examples of enabling the output driver and the input buffer include the transition of gating signal POC2' at time T2 in FIG. 3C, or the like. From block 624, flow proceeds to block 626.

At block 626, after the output signal of the input buffer has stabilized, the input level shifter is enabled. Examples of the input level shifter include input level shifter 324 of FIG. 3A, or the like. Examples of enabling the input level shifter include the transition of gating signal POC3' at time T3 in FIG. 3C, or the like.

Figure 6D:
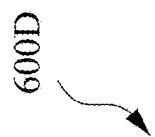
Figure 6D:

FIG. 6D is a flowchart of a method 600D of generating gating signals for a multi-gated I/O system, in accordance with some embodiments.

Examples of the multi-gated I/O system for which method 600D generates gating signals include I/O system 404 of FIG. 4A, or the like.

In FIG. 6D, method 600D includes blocks 632-634. At block 632, an output level shifter, an input buffer and an input level shifter are enabled. Examples of the output level shifter include output level shifter 418 of FIG. 4A, or the like. Examples of the input buffer include input buffer 422 of FIG. 4A, or the like. Examples of the input level shifter include input level shifter 424 of FIG. 4A, or the like.

Examples of enabling the output level shifter, the input buffer and the input level shifter include the transition of gating signal POC1' at time T1 in FIG. 4C relative to FIG. 4A, or the like. From block 632, flow proceeds to block 634.

At block 634, after the output signal of the output level shifter has stabilized, an output driver is enabled. Examples of the output driver include output driver 420 of FIG. 4A, or the like. Examples of enabling the output driver include the transition of gating signal POC2' at time T2 in FIG. 4C relative to FIG. 4A, or the like.

Figure 6E:
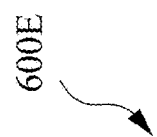
Figure 6E:

FIG. 6E is a flowchart of a method 600E of generating gating signals for a multi-gated I/O system, in accordance with some embodiments.

Examples of the multi-gated I/O system for which method 600E generates gating signals include I/O system 504 of FIG. 5A, or the like.

In FIG. 6E, method 600E includes blocks 642-644. At block 642, an output level shifter, an output driver and an input buffer are enabled. Examples of the output level shifter include output level shifter 518 of FIG. 5A, or the like. Examples of the output driver include output driver 520 of FIG. 5A, or the like. Examples of the input buffer include input buffer 522 of FIG. 5A, or the like. Examples of enabling the output level shifter include the transition of gating signal POC1' at time T1 in FIG. 4C relative to FIG. 5A, or the like. From block 642, flow proceeds to block 644.

At block 644, after the output signal of the input buffer has stabilized, an input level shifter is enabled. Examples of the input level shifter include input level shifter 524 of FIG. 5A, or the like. Examples of enabling the input level shifter include the transition of gating signal POC2' at time T2 in FIG. 4C relative to FIG. 5A, or the like.

Figure 6F:
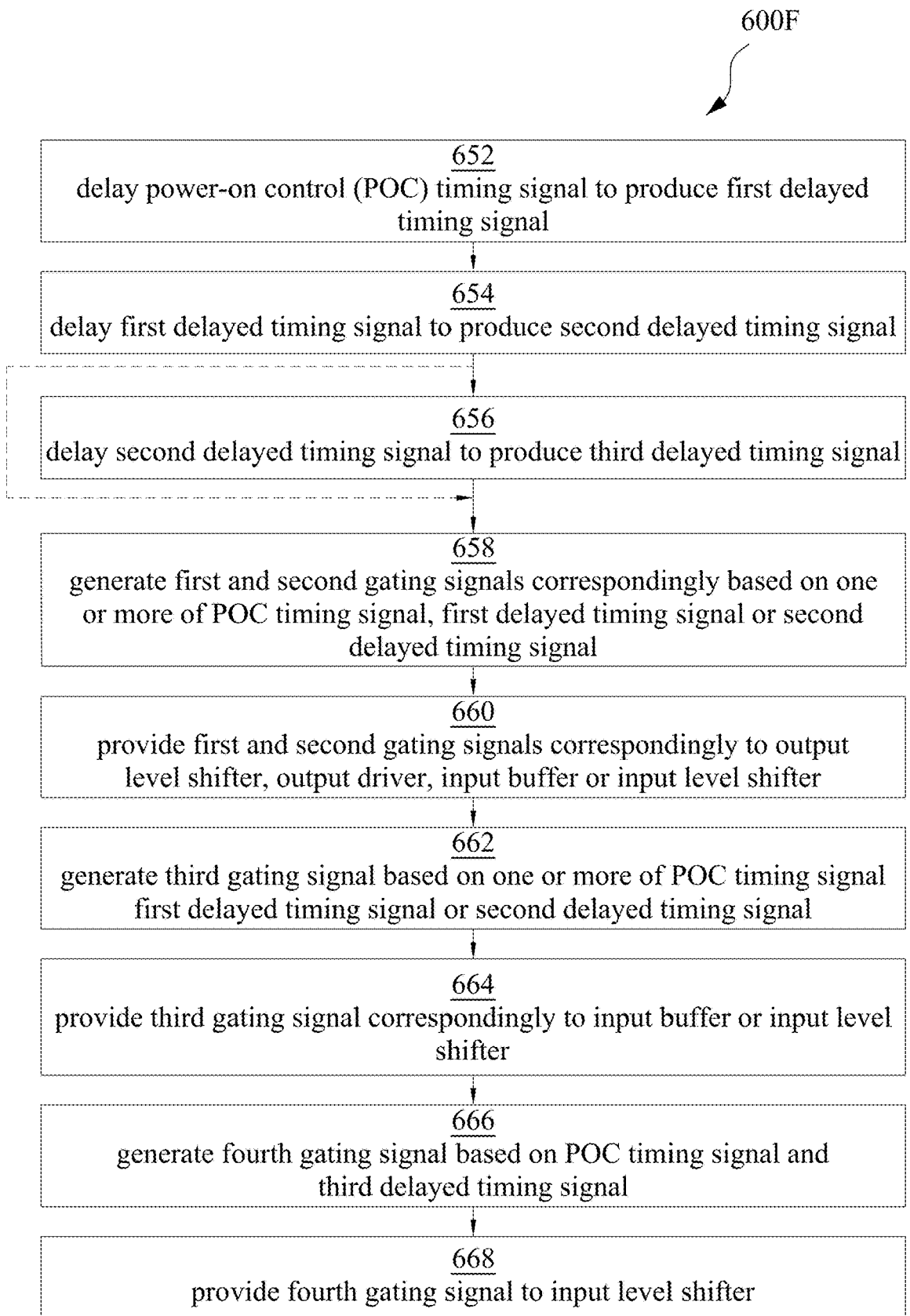
FIGS. 6F-6K are corresponding flowcharts of corresponding methods of generating gating signals for a multi-gated I/O system, in accordance with some embodiments.

FIG. 6F is a flowchart of a method 600F of generating gating signals for a multi-gated I/O system, in accordance with some embodiments.

In FIG. 6F, method 600F includes blocks 652-668. Examples of the multi-gated I/O system for which blocks 652-654 and 658-660 of method 600F generate gating signals include I/O system 204 of FIG. 2A, I/O system 304 of FIG. 3A, I/O system 404 of FIG. 4A, I/O system 504 of FIG. 5A, or the like. Examples of the multi-gated I/O system for which blocks 652-664 of method 600F generate gating signals include I/O system 204 of FIG. 2A, I/O system 304 of FIG. 3A, or the like. Examples of the multi-gated I/O system for which blocks 652-668 of method 600F generate gating signals include I/O system 204 of FIG. 2A, or the like.

At block 652, a power-on (PO) timing signal is delayed to produce a first delayed timing signal. An example of the PO timing signal is timing signal POC0 generated by PO signal generator 210 in FIGS. 2A, 3A, 4A and 5A, or the like. An example of the first delayed timing signal is timing signal POC0_D1 generated by delay cell 230(1) in FIGS. 2E and 3B, or the like. From block 652, flow proceeds to block 654.

At block 654, the first delayed timing signal is delayed to produce a second delayed timing signal. An example of the second delayed timing signal is timing signal POC0_D2 generated by delay cell 230(2) in FIGS. 2E and 3B, or the like. In some embodiments, e.g., I/O system 404 of FIG. 4A, I/O system 504 of FIG. 5A, or the like, flow proceeds from block 654 to block 658. In some embodiments, e.g., I/O system 204 of FIG. 2A, I/O system 304 of FIG. 3A, or the like, flow proceeds from block 654 to block 656.

At block 656, the second delayed timing signal is delayed to produce a third delayed timing signal. An example of the third delayed timing signal is timing signal POC0_D3 generated by delay cell 230(3) in FIG. 2E, or the like. From block 656, flow proceeds to block 658.

At block 658, first and second gating signals are generated correspondingly based on one or more of the POC timing signal, the first delayed timing signal or the second delayed timing signal. Examples of the first gating signal include gating signal POC1 of FIG. 2A, gating signal POC1' of FIG. 3A, gating signal POC1' of FIG. 4A, gating signal POC1' of FIG. 5A, or the like. Examples of the second gating signal include gating signal POC2 of FIG. 2A, gating signal POC2' of FIG. 3A, gating signal POC2' of FIG. 4A, gating signal POC2' of FIG. 5A, or the like. From block 658, flow proceeds to block 660.

At block 660, the first and second gating signals as provided to the output level shifter, the output driver, the input buffer or the input level shifter. Examples of providing the first gating signal correspondingly to the output level shifter, the output driver, the input buffer or the input level shifter include: providing gating signal POC1 to output level shifter 218 in FIG. 2A, providing gating signal POC1' to output level shifter 318 in FIG. 3A, providing gating signal POC1' to output level shifter 418, input buffer 422 and input level shifter 424 in FIG. 4A, providing gating signal POC1' to output level shifter 518, output driver 520 and input buffer 522 in FIG. 5A, or the like. Examples of providing the second gating signal correspondingly to the output level shifter, the output driver, the input buffer or the input level shifter include: providing gating signal POC2 to output driver 220 in FIG. 2A, providing gating signal POC2' to output driver 320 and input buffer 322 in FIG. 3A, providing gating signal POC2' to output driver 420 in FIG. 4A, providing gating signal POC2' to input level shifter 524 in FIG. 5A, or the like. From block 660, flow proceeds to block 662.

At block 662, a third gating signal is generated based on one or more of the POC timing signal, the first delayed timing signal or the second delayed timing signal. Examples of the third gating signal include gating signal POC3 of FIG. 2A, gating signal POC3' of FIG. 3A, or the like. From block 662, flow proceeds to block 664.

At block 664, the third gating signal is supplied to the input buffer or the input level shifter. Examples of providing the third gating signal to the input buffer include providing gating signal POC3 to input buffer 222 of FIG. 2A, or the like. Examples of providing the third gating signal to the input level shifter include providing gating signal POC3' to input level shifter 324 of FIG. 3A. From block 664, flow proceeds to block 666.

At block 666, a fourth gating signal is generated based on the POC timing signal and the third delayed timing signal. Examples of the fourth gating signal include gating signal POC4 of FIG. 2A, or the like. From block 666, flow proceeds to block 668.

At block 668, the fourth gating signal is supplied to the input level shifter. Examples of providing the fourth gating signal to the input level shifter include providing gating signal POC4 to input level shifter 224 of FIG. 2A, or the like.

Figure 6G:
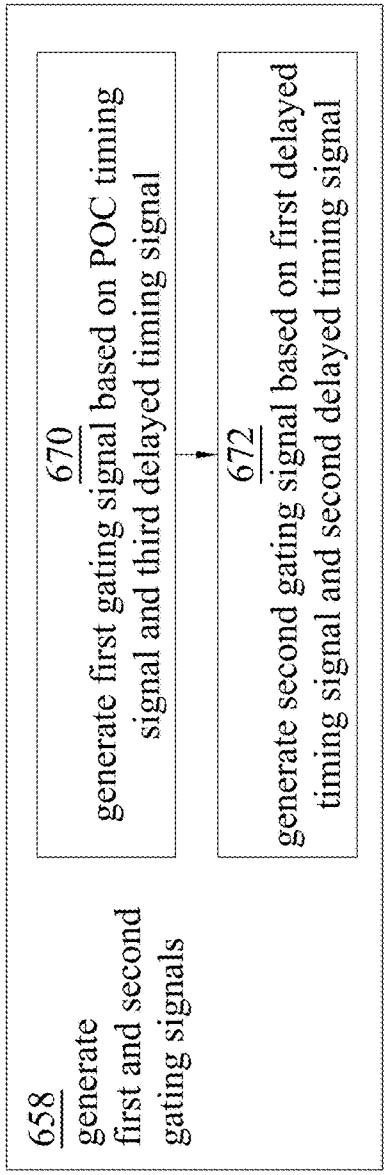

FIG. 6G is a flowchart of a method 600G of generating gating signals for a multi-gated I/O system, in accordance with some embodiments.

More particularly, the flowchart of FIG. 6G shows additional blocks included in block 658 of FIG. 6F, in accordance with one or more embodiments. In FIG. 6G, block 658 includes blocks 670-672.

At block 670, the first gating signal is generated, more particularly, based on the POC timing signal and the third delayed timing signal. Examples of the first gating signal include gating signal POC1 of FIG. 2A, or the like. In some embodiments, the first gating signal is generated based on making a logical NOR combination. Examples of the first gating signal being based on a logical NOR combination include gating signal POC1 of FIGS. 2A and 2E (which is generated in part by NOR gate 236(1) of FIG. 2E), or the like. From block 670, flow proceeds to block 672.

At block 672, the second gating signal is generated based on the first delayed timing signal and the second delayed timing signal. Examples of the second gating signal include gating signal POC2 of FIG. 2A, or the like. In some embodiments, the second gating signal is generated based on making a logical NOR combination. Examples of the second gating signal being based on a logical NOR combination include gating signal POC2 of FIGS. 2A and 2E (which is generated in part by NOR gate 236(2) of FIG. 2E), or the like.

Figure 6H:
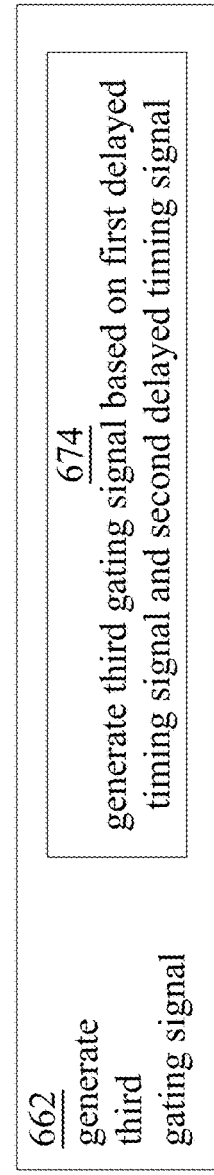

FIG. 6H is a flowchart of a method 600H of generating gating signals for a multi-gated I/O system, in accordance with some embodiments.

More particularly, the flowchart of FIG. 6H shows additional blocks included in block 662 of FIG. 6F, in accordance with one or more embodiments. In FIG. 6H, block 662 includes block 674.

At block 674, the third gating signal is generated, more particularly, based on the first delayed timing signal and the second delayed timing signal. Examples of the third gating signal include gating signal POC3 of FIG. 2A, or the like. In some embodiments, the third gating signal is generated based on making a logical NAND combination. Examples of the third gating signal being based on a logical NAND combination include gating signal POC3 of FIGS. 2A and 2E (which is generated in part by NAND gate 238(1) of FIG. 2E), or the like.

Figure 6I:
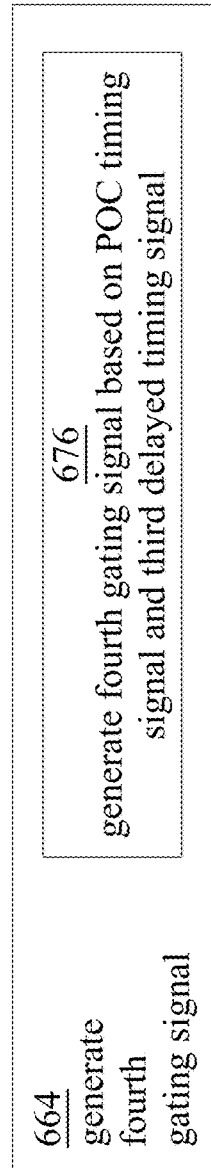

FIG. 6I is a flowchart of a method 600I of generating gating signals for a multi-gated I/O system, in accordance with some embodiments.

More particularly, the flowchart of FIG. 6I shows additional blocks included in block 664 of FIG. 6F, in accordance with one or more embodiments. In FIG. 6I, block 664 includes block 676.

At block 676, the fourth gating signal is generated, more particularly, based on the POC timing signal and the third delayed timing signal. Examples of the fourth gating signal include gating signal POC4 of FIG. 2A, or the like. In some embodiments, the fourth gating signal is generated based on making a logical NAND combination. Examples of the fourth signal being based on a logical NAND combination include gating signal POC4 of FIGS. 2A and 2E (which is generated in part by NAND gate 238(2) of FIG. 2E), or the like.

Figure 6J:
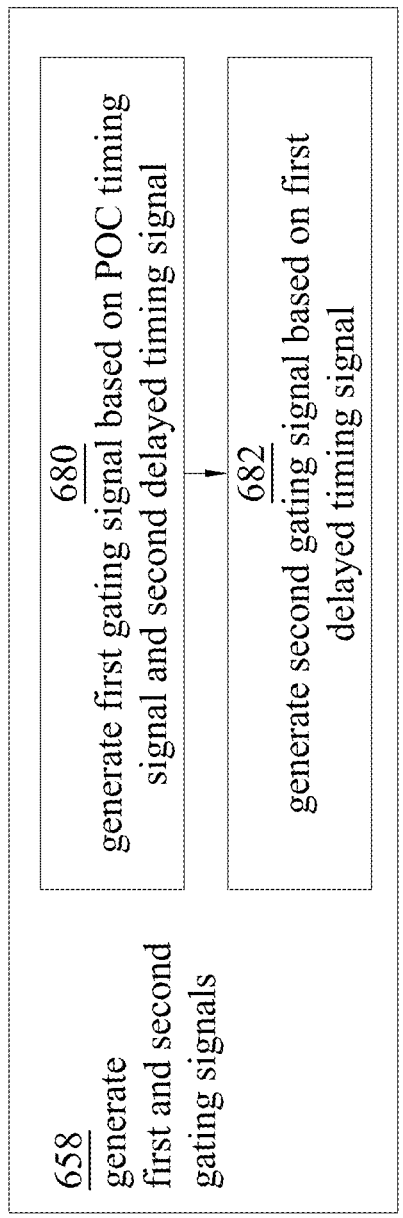

FIG. 6J is a flowchart of a method 600J of generating gating signals for a multi-gated I/O system, in accordance with some embodiments.

More particularly, the flowchart of FIG. 6J shows additional blocks included in block 658 of FIG. 6F, in accordance with one or more embodiments. In FIG. 6J, block 658 includes blocks 680-682.

At block 680, the first gating signal is generated, more particularly, based on the POC timing signal and the second delayed timing signal. Examples of the first gating signal include gating signal POC1' of FIG. 3A, gating signal POC1' of FIG. 4A, gating signal POC1' of FIG. 5A, or the like. In some embodiments, the first gating signal is generated based on making a logical NOR combination. Examples of the first gating signal being based on a logical NOR combination include gating signal POC1' of FIGS. 3A and 3B (which is generated in part by NOR gate 336(3) of FIG. 3B), gating signal POC1' of FIGS. 4A and 4B (which is generated in part by NOR gate 336(3) of FIG. 4B), or the like. From block 680, flow proceeds to block 682.

At block 682, the second gating signal is generated based on the first delayed timing signal. Examples of the second gating signal include gating signal POC2' of FIG. 3A, gating signal POC2' of FIG. 4A, gating signal POC2' of FIG. 5A, or the like. In some embodiments, the second gating signal is generated based on making a logical inversion. Examples of the second gating signal being based on a logical inversion include gating signal POC2' of FIGS. 3A and 3B (which is generated in part by inverter 334(11) of FIG. 3B), gating signal POC2' of FIGS. 4A and 4B (which is generated in part by inverter 334(11) of FIG. 4B), or the like.

Figure 6K:
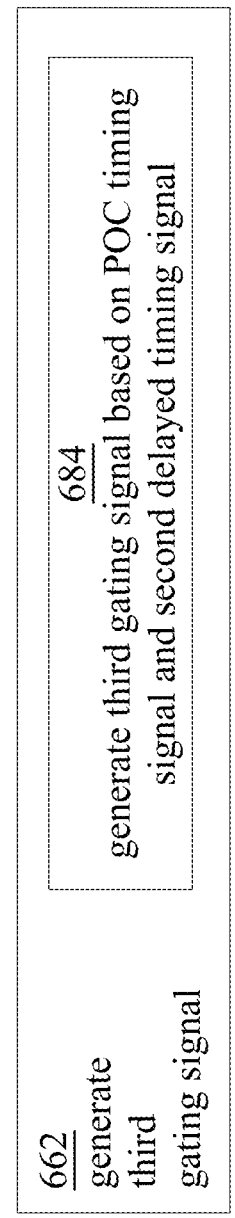

FIG. 6K is a flowchart of a method 600K of generating gating signals for a multi-gated I/O system, in accordance with some embodiments.

More particularly, the flowchart of FIG. 6K shows additional blocks included in block 662 of FIG. 6F, in accordance with one or more embodiments. In FIG. 6K, block 662 includes block 684.

At block 684, the third gating signal is generated, more particularly, based on the POC timing signal and the second delayed timing signal. Examples of the third gating signal include gating signal POC3' of FIG. 3B, or the like. In some embodiments, the third gating signal is generated based on making a logical NAND combination. Examples of the third gating signal being based on a logical NAND combination include gating signal POC3' of FIGS. 3A and 3B (which is generated in part by NAND gate 338(3) of FIG. 3B), or the like.

Figure 7:
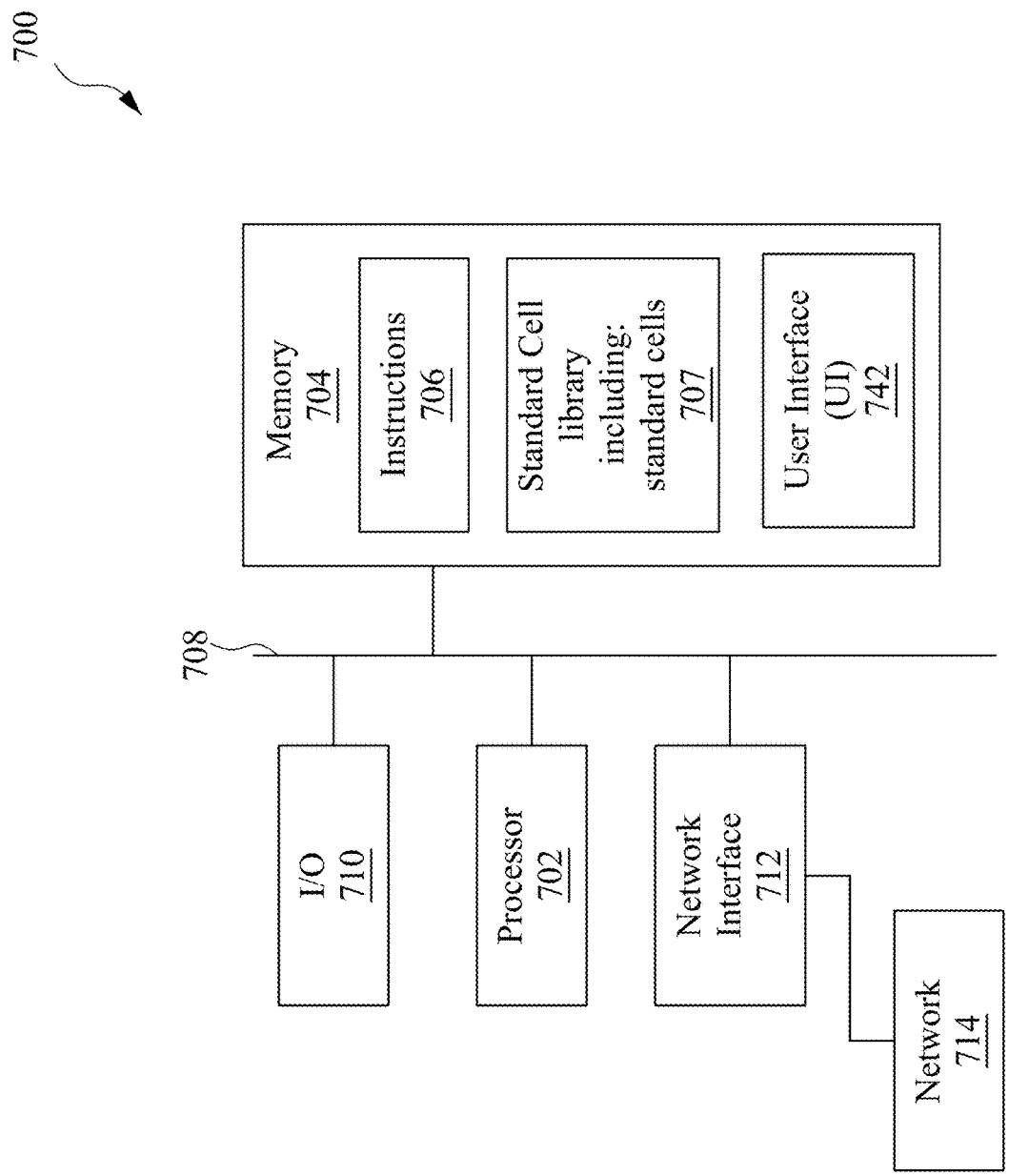
FIG. 7 is a block diagram of an electronic design automation (EDA) system in accordance with some embodiments.

FIG. 7 is a block diagram of an electronic design automation (EDA) system 700 in accordance with some embodiments.

In some embodiments, EDA system 700 includes an APR system. Methods described herein of designing layout diagrams represent wire routing arrangements, in accordance with one or more embodiments, are implementable, for example, using EDA system 700, in accordance with some embodiments.

In some embodiments, EDA system 700 is a general purpose computing device including a hardware processor 702 and a non-transitory, computer-readable storage medium 704. Storage medium 704, amongst other things, is encoded with, i.e., stores, computer program code 706, i.e., a set of computer-executable instructions. Execution of instructions 706 by hardware processor 702 represents (at least in part) an EDA tool which implements a portion or all of the methods described herein in accordance with one or more embodiments (hereinafter, the noted processes and/or methods).

Processor 702 is electrically coupled to computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause system 700 (where such execution represents (at least in part) the EDA tool) to be usable for performing a portion or all of the noted processes and/or methods. In one or more embodiments, storage medium 704 also stores information which facilitates performing a portion or all of the noted processes and/or methods. In one or more embodiments, storage medium 704 stores library 707 of standard cells including such standard cells as disclosed herein.

EDA system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 coupled to processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 700.

System 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
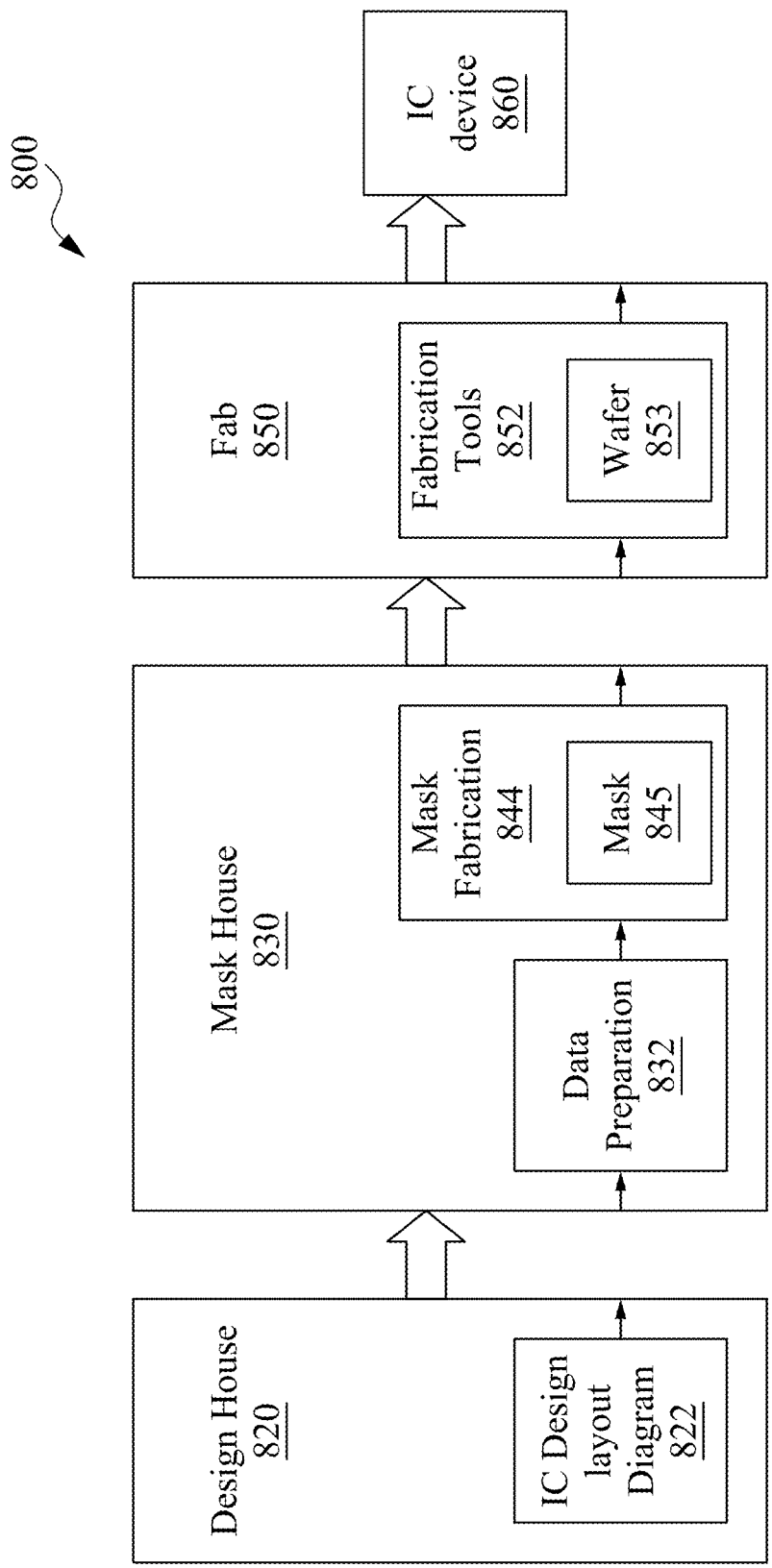
FIG. 8 is a block diagram of a semiconductor device manufacturing system, and an IC manufacturing flow associated therewith, in accordance with some embodiments.

FIG. 8 is a block diagram of an integrated circuit (IC) manufacturing system 800, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 includes fabrication tools 852 configured to execute various manufacturing operations on semiconductor wafer 853 such that IC device 860 is fabricated in accordance with the mask(s), e.g., mask 845. In various embodiments, fabrication tools 852 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In an embodiment, a power-on (PO) signal generator includes: a supply-variation sensitivity-reducing (SVSR) load coupled between a first reference voltage and a first node; an NMOS transistor coupled between the first node and a second reference voltage; a buffer having an input coupled to the first node and an output configured to provide a PO signal. And wherein: each of a first control signal of the SVT load and a gate terminal the NMOS transistor is coupled to a monitored voltage; and the monitored voltage is in a range between the first reference voltage and the second reference voltage. In an embodiment, the SVSR load includes: a first resistor coupled between the first reference voltage and a second node; and a first PMOS transistor coupled between the second node and the first node; and wherein a gate terminal of the first PMOS transistor is coupled to the first control signal of the SVT load and so is coupled to the monitored voltage. In an embodiment, the SVSR load further includes: a second resistor coupled between the first reference voltage and a third node; and a second PMOS transistor coupled between the first reference voltage and the third node. And wherein: the first resistor is coupled between the third node and the second node; and a gate terminal of the second PMOS transistor is coupled to a second control signal of the SVT load and is coupled to a fourth node, the fourth node being internal to the buffer. In an embodiment, the buffer includes: a first inverter coupled between the second node and the fourth node; and a second inverter having an input coupled to the fourth node and an output configured to provide the PO signal.

In an embodiment, there is a method of operating a power-on (PO) signal generator which generates a PO signal and includes a supply-variation sensitivity-reducing (SVSR) load coupled between a first reference voltage and a first node, and an NMOS transistor coupled between the first node and a second reference voltage, the SVSR load including a first resistor coupled between the first reference voltage and a second node, and a PMOS transistor coupled between the second node and the first node, each of a first control signal of the SVT load and a gate terminal the NMOS transistor being coupled to a monitored voltage, the method including: when the monitored voltage is below a threshold voltage of the NMOS transistor, turning off the NMOS transistor, and pulling each of each of a first node voltage on the first node, a second node voltage on the second node, a third node voltage of the PMOS transistor, and the PO signal up to a logical high value; and at a first point in time when the monitored voltage reaches and then rises above the threshold voltage of the NMOS transistor, turning on the NMOS transistor, and pulling each of each of the first node voltage on the first node, the second node voltage on the second node, the third node voltage of the PMOS transistor, and the PO signal down to a logical low value. In an embodiment, at the first point in time, a transition from the logical high value to the logical low value is: sharp for the PO signal; and, as compared to the PO signal, progressively more gradual for the first node voltage on the first node, the second node voltage on the second node, and the third node voltage. In an embodiment, the monitored voltage peaks at a second point in time; and the method further includes, at a third point in time when the monitored voltage falls below the threshold voltage of the NMOS transistor, turning off the NMOS transistor, and pulling each of each of the first node voltage on the first node, the second node voltage on the second node, the third node voltage and the PO signal up to a logical high value. In an embodiment, at the third point in time, a transition from the logical low value to the logical high value is: sharp for the PO signal; and, as compared to the PO signal, progressively more gradual, for the first node voltage on the first node, the second node voltage on the second node, and the third node voltage.

In an embodiment, there is a method of operating a power-on (PO) signal generator which generates a PO signal and includes a supply-variation sensitivity-reducing (SVSR) load coupled between a first reference voltage and a first node, and an NMOS transistor coupled between the first node and a second reference voltage, the SVSR load including a first resistor and a first PMOS transistor coupled in parallel between the first reference voltage and a second node, a second resistor coupled between the second node and a third node, and a second PMOS transistor coupled between the third node and the first node, each of a first control signal of the SVT load and a gate terminal the NMOS transistor being coupled to a monitored voltage, and a second control signal of the SVT load being coupled to a fourth voltage, the method including: when the monitored voltage is below a threshold voltage of the NMOS transistor, turning off the NMOS transistor; pulling the second control signal down to a logical low value, pulling each of each of a first node voltage on the first node, a second node voltage on the third node, a third node voltage of the second PMOS transistor, and the PO signal up to a logical high value, and at a first point in time when the monitored voltage reaches and then rises above the threshold voltage of the NMOS transistor, turning on the NMOS transistor, pulling the second control signal up to a logical high value, and pulling each of each of the first node voltage on the first node, the second node voltage on the second node, the third node voltage of the second PMOS transistor, and the PO signal down to a logical low value. In an embodiment, at the first point in time, a transition from the logical high value to the logical low value is: sharp for the PO signal; substantially sharp for the second control signal; and, as compared to the second control signal, progressively more gradual for the first node voltage on the first node, the second node voltage on the second node, and the third node voltage. In an embodiment, the monitored voltage peaks at a second point in time; and the method further includes, at a third point in time when the monitored voltage falls below the threshold voltage of the NMOS transistor, turning off the NMOS transistor, pulling the second control signal down to a logical low value, and pulling each of each of the first node voltage on the first node, the second node voltage on the second node, the third node voltage and the PO signal up to a logical high value. In an embodiment, at the third point in time, a transition from the logical low value to the logical high value is: sharp for the PO signal; substantially sharp for the second control signal; and, as compared to the second control signal, progressively more gradual for the first node voltage on the first node, the second node voltage on the second node, and the third node voltage.

In an embodiment, a power-on (PO) signal generator (for generating a PO signal) includes: a supply-variation sensitivity-reducing (SVSR) load coupled between a first reference voltage and a first node; a switch coupled between the first node and a second reference voltage; each of a first control input of the SVT load and a control input of the switch being coupled to a monitored voltage as a first control signal; and a buffer having an input coupled to the first node and an output configured to provide a PO signal. And wherein: the SVSR load, the switch and the buffer are configured to monitor a state of the monitored voltage and correspondingly generate the PO signal, the SVSR load, the switch and the buffer are configured with a threshold voltage based on which a state of the PO signal is changed; and the SVSR load, the switch and the buffer are further configured to vary the threshold voltage. In an embodiment, the switch includes an NMOS transistor. In an embodiment, the SVSR load, the switch and the buffer are further configured to change the threshold voltage so that the threshold voltage exhibits hysteresis. In an embodiment, the SVSR load, the switch and the buffer are further configured to adapt the threshold voltage so that the threshold voltage exhibits hysteresis with respect to the monitored voltage. In an embodiment, the SVSR load includes a first resistor coupled between the first reference voltage and a first node, a first PMOS transistor coupled between the first reference voltage and the first node; a second resistor coupled between the first node and a second node, and a second PMOS transistor coupled between the second node and a third node; a gate terminal of the second PMOS transistor is the first control input of the SVT load; a second control input of the SVT load is a gate terminal of the first PMOS transistor; the second control input of the SVT load is configured to receive a signal on a fourth node as a second control signal, the fourth node being an internal node of the buffer; and the second control signal is configured to induce the threshold voltage to exhibit hysteresis. In an embodiment, the buffer includes: a first inverter coupled between the first node and the fourth node; and a second inverter having an input coupled to the fourth node and an output configured to provide the PO signal.

In an embodiment, there is a method of operating a power-on (PO) signal generator, the PO signal generator including a supply-variation sensitivity-reducing (SVSR) load coupled between a first reference voltage and a first node, a switch coupled between the first node and a second reference voltage, each of a first control signal of the SVT load and a control signal of the switch being coupled to a monitored voltage as a first control signal, and a buffer having an input coupled to the first node and an output configured to provide a PO signal, the method including: monitoring a state of the monitored voltage and correspondingly generating the PO signal; changing a state of the PO signal based on the monitored voltage and a threshold voltage of the SVSR load, the switch and the buffer; and varying the threshold voltage so that the threshold voltage exhibits hysteresis. In an embodiment, the varying the threshold voltage includes changing the threshold voltage so that the threshold voltage exhibits hysteresis. In an embodiment, the varying the threshold voltage includes adapting the threshold voltage so that the threshold voltage exhibits hysteresis with respect to the monitored voltage.

In an embodiment, a system (for generating multi-gated power-on control signals) includes: a multi-gated input/out (I/O) interface configured to receive at least first and second gating signals; and a gated power-on control (POC) signals generator configured to generate at least the first and second gating signals for the multi-gated I/O interface, a waveform of the first gating signal being different from a waveform of the second gating signal. In an embodiment, the multi-gated I/O interface includes: an output level shifter and an output driver coupled in series between an output node of a core circuit and an external terminal of the system; an input buffer and an input level shifter coupled in series between the external terminal and an input node of the core circuit; and the gated POC signals generator is further configured to generate at least the first and second gating signals and provide and provide at least the first and second gating signals correspondingly to the output level shifter, the output driver, the input buffer or the input level shifter.

In an embodiment, the gated power-on control (POC) signals generator is further configured to generate a third gating signal in addition to at least the first and second gating signals and provide the first, second and third gating signals correspondingly to the output level shifter, the output driver, the input buffer or the input level shifter. In an embodiment, the multi-gated I/O interface is further configured for: the output level shifter to receive the first gating signal; each of the output driver and the input buffer to receive the second gating signal; and the input level shifter to receive the third gating signal. In an embodiment, the gated power-on control (POC) signals generator is further configured to generate a fourth gating signal in addition to the first, second and third gating signals and provide the first, second, third and fourth gating signals correspondingly to the output level shifter, the output driver, the input buffer or the input level shifter. In an embodiment, the multi-gated I/O interface is further configured for: the output level shifter to receive the first gating signal; the output driver to receive the second gating signal; the input buffer to receive the third gating signal; and the input level shifter to receive the fourth gating signal. In an embodiment, the multi-gated I/O interface is further configured for: each of the output level shifter, the input buffer and the input level shifter to receive the first gating signal; and the output driver to receive the second gating signal. In an embodiment, the multi-gated I/O interface is further configured for: each of the output level shifter, the output driver and the input buffer to receive the first gating signal; and the input level shifter to receive the second gating signal. In an embodiment, the gated POC signals generator includes: first and second delay cells coupled in series and configured to receive a power-on control (POC) signal and correspondingly generate a first delayed version of the POC signal (first delayed signal) and a second delayed signal; and a logic circuit to generate the first and second gating signals based on the corresponding first and second delayed signals. In an embodiment, the first and second delay cells coupled in series form an RC tree network. In an embodiment, the second delay cell is configured to generate the second delayed signal based on the first delayed signal.

In an embodiment, the gated POC signals generator further includes: a third delay cell coupled in series with the second delay cell and configured to generate a third delayed signal based on the second delayed signal. In an embodiment, the logic circuit is further configured to generate: the first gating signal based on the POC signal and the second delayed signal; and the second gating signal based on the first delayed signal. In an embodiment, the logic circuit includes: a NOR gate to generate the first gating signal based on the POC signal and the second delayed signal; and an inverter to generate the second gating signal based on the second delayed signal. In an embodiment, the logic circuit is further configured to generate: a third gating signal based on the POC signal and the second delayed signal. In an embodiment, the logic circuit further includes: an NAND gate to generate the third gating signal based on the second delayed signal and the first delayed signal.

In an embodiment, the system further includes: a third delay cell coupled in series with the second delay cell and configured to generate a third delayed signal based on the second delayed signal; and wherein the logic circuit is further configured to generate third and fourth gating signals based correspondingly on the second and third delayed signals. In an embodiment, the logic circuit is further configured to generate: the first gating signal based on the POC signal and the third delayed signal; the second gating signal based on the first delayed signal and the second delayed signal; the third gating signal based on the second delayed signal and the first delayed signal; and the fourth gating signal based on the third delayed signal and the POC signal.

In an embodiment, the logic circuit includes: a first NOR gate to generate the first gating signal based on the POC signal and the third delayed signal; a second NOR gate to generate the second gating signal based on the first delayed signal and the second delayed signal; a first NAND gate to generate the third gating signal based on the second delayed signal and the first delayed signal; and a second NAND gate to generate the fourth gating signal based on the third delayed signal and the POC signal. In an embodiment, the multi-gated I/O interface is further configured to: enable the output driver after an output signal of the output level shifter has stabilized; or enable the input level shifter after an output signal of the input buffer has stabilized.

In an embodiment, a method (of generating multi-gated power-on control signals) includes: for a output level shifter and an output driver coupled in series between an output node of a core circuit and an external terminal of a corresponding system, enabling the output level shifter, and after an output signal of the output level shifter has stabilized, enabling the output driver; or for an input buffer and a input level shifter coupled in series between the external terminal and an input node of the core circuit, enabling the input buffer, and after an output signal of the input buffer has stabilized, enabling the input level shifter. In an embodiment, the input buffer is enabled after an output signal of the output driver has stabilized.

In an embodiment, a system (for generating multi-gated power-on control signals) includes: an output level shifter and coupled between an output node of a core circuit and a first node; an output driver coupled between the first node and an external terminal of the system; an input buffer coupled between the external terminal and a second node; an input level shifter coupled between the second node and an input node of the core circuit; and a gated POC signals generator configured to enable the output driver after an output signal of the output level shifter has stabilized, or enable the input level shifter after an output signal of the input buffer has stabilized. In an embodiment, the gated POC signals generator is further configured to: delay a power-on control (POC) signal to produce a first delayed version of the POC signal (first delayed signal); delay the first delayed signal to produce a second delayed signal; generate first and second gating signals based correspondingly on one or more of the POC signal, the first delayed signal or the second delayed signal; and provide the first and second gating signals correspondingly to the output level shifter, the output driver, the input buffer or the input level shifter. In an embodiment, the gated POC signals generator is further configured to: enable the input buffer after an output signal of the output driver has stabilized.

In an embodiment, a method for use with a output level shifter and an output driver coupled in series between an output node of a core circuit and an external terminal of a corresponding system, and an input buffer and a input level shifter coupled in series between the external terminal and an input node of the core circuit, the method (of generating multi-gated power-on control signals) including: delaying a power-on control (POC) signal to produce a first delayed version of the POC signal (first delayed signal); delaying the first delayed signal to produce a second delayed signal; generating first and second gating signals based correspondingly on one or more of the POC signal, the first delayed signal or the second delayed signal; and providing the first and second gating signals correspondingly to the output level shifter, the output driver, the input buffer or the input level shifter. In an embodiment, the generating first and second gating signals includes generating the first gating signal based on the POC signal and the second delayed signal; the generating first and second gating signals includes generating the second gating signal based on the first delayed signal; or generating a third gating signal based on the POC signal and the second delayed signal. In an embodiment, the generating the first gating signal includes inverting the POC signal to form a POC_bar signal, inverting the second delayed signal to form a second delayed_bar signal, and making an logical NOR combination of the POC_bar signal and the second delayed_bar signal resulting in the first gating signal; the generating the second gating signal includes inverting the first delayed signal to form a first delayed_bar signal, and inverting the first delayed_bar signal resulting in the second gating signal; or the generating the third gating signal includes making an logical NAND combination of the POC_bar signal and the second delayed_bar signal resulting in the third gating signal. In an embodiment, the method further includes: delaying the second delayed signal to produce a third delayed signal; and generating third and fourth gating signals based correspondingly on one or more of the POC signal, first delayed signal, second or third delayed signals. In an embodiment, the generating first and second gating signals includes: generating the first gating signal based on the POC signal and the third delayed signal; generating the second gating signal based on the first delayed signal and the second delayed signal; generating the third gating signal based on the first delayed signal and the second delayed signal; and generating the fourth gating signal based on the third delayed signal and the POC signal. In an embodiment, the generating the first gating signal includes inverting the POC signal to form a POC_bar signal, inverting the third delayed signal to form a third delayed_bar signal, and making an logical NOR combination of the POC_bar signal and the third delayed_bar signal resulting in the first gating signal; the generating the second gating signal includes inverting the first delayed signal to form a first delayed_bar signal; and inverting the second delayed signal to form a second delayed_bar signal, and making an logical NOR combination of first delayed signal and the second delayed_bar signal resulting in the second gating signal; the generating the third gating signal includes making an logical NAND combination of the first delayed_bar signal and the second delayed_bar signal resulting in the third gating signal; and the generating the fourth gating signal includes making an logical NAND combination of the POC_bar signal and the third delayed_bar signal resulting in the fourth gating signal.

In some embodiments, a method of generating multiple gating signals for a multi-gated input/output (I/O) system is provided. The system includes an output level shifter and an output driver which are coupled in series between an output node of a core circuit and an external terminal of a corresponding system. The method includes: generating first and second gating signals having corresponding first and second waveforms, the first waveform transitioning from a non-enabling state to an enabling state before the second waveform transitions from the non-enabling state to the enabling state; receiving the first gating signal at the output level shifter; and receiving the second gating signal at the output driver.

In some embodiments, the method further includes: delaying a power-on control (POC) signal to produce a first delayed version of the POC signal (first delayed signal); and delaying the first delayed signal to produce a second delayed signal; and wherein the generating first and second gating signals includes basing the first and second gating signals correspondingly on one or more of the POC signal, the first delayed signal or the second delayed signal. In some embodiments, the method further includes: delaying the second delayed signal; and to produce a third delayed signal; and wherein the basing the first and second gating signals includes forming the first gating signal according to the POC signal and the third delayed signal, and forming the second gating signal according to the first delayed signal and the second delayed signal. In some embodiments, the multi-gated input/output (I/O) system further includes an input buffer and an input level shifter which are coupled in series between the external terminal and an input node of the core circuit; and the method further includes generating third and fourth gating signals having corresponding third and fourth waveforms; the third waveform transitioning from the non-enabling state to the enabling state after the second waveform transitions from the non-enabling state to the enabling state; and the third waveform transitioning from the non-enabling state to the enabling state before the fourth waveform transitions from the non-enabling state to the enabling state; receiving the third gating signal at the input buffer; and receiving the fourth gating signal at the input level shifter. In some embodiments, the generating the third and fourth gating signals includes: forming the third gating signal according to the first delayed signal and the second delayed signal; and forming the fourth gating signal according to the third delayed signal and the POC signal. In some embodiments, the forming the third gating signal includes: inverting the POC signal to form a POC_bar signal; inverting the first delayed signal to form a first delayed_bar signal; inverting the second delayed signal to form a second delayed_bar signal; inverting the third delayed signal to form a third delayed_bar signal; and making a logical NAND combination of the first delayed_bar signal and the second delayed_bar signal resulting in the third gating signal; and the forming the fourth gating signal includes making an logical NAND combination of the POC_bar signal and the third delayed_bar signal resulting in the fourth gating signal.

In some embodiments, the fourth waveform transitions from the enabling state to the non-enabling state before the third waveform transitions from the enabling state to the non-enabling state. In some embodiments, the forming the first gating signal includes: inverting the POC signal to form a POC_bar signal; inverting the third delayed signal to form a third delayed_bar signal; and making a logical NOR combination of the POC_bar signal and the third delayed_bar signal resulting in the first gating signal; and the generating the second gating signal includes: inverting the first delayed signal to form a first delayed_bar signal; and inverting the second delayed signal to form a second delayed_bar signal; and making a logical NOR combination of first delayed signal and the second delayed_bar signal resulting in the second gating signal. In some embodiments, the multi-gated input/output (I/O) system further includes an input buffer and an input level shifter which are coupled in series between the external terminal and an input node of the core circuit; and the method further includes receiving the second gating signal at the input buffer. In some embodiments, the basing the first and second gating signals includes: forming the first gating signal according to the POC signal and the second delayed signal; and forming the second gating signal according to the first delayed signal. In some embodiments, the forming the first gating signal includes: inverting the POC signal to form a POC_bar signal; inverting the second delayed signal to form a second delayed_bar signal; and making a logical NOR combination of the POC_bar signal and the second delayed_bar signal resulting in the first gating signal; and the forming the second gating signal includes inverting the first delayed signal to form a first delayed_bar signal; and inverting the first delayed signal to form a second delayed_bar signal; and inverting the second delayed_bar signal resulting in the second gating signal. In some embodiments, the method further includes: generating a third gating signal having a third waveform; the third waveform transitioning from the non-enabling state to the enabling state after the second waveform transitions from the non-enabling state to the enabling state; and receiving the third gating signal at the input level shifter. In some embodiments, the multi-gated input/output (I/O) system further includes an input buffer and an input level shifter which are coupled in series between the external terminal and an input node of the core circuit; and the method further includes: receiving the first gating signal at each of the input buffer and the input buffer. In some embodiments, the method further includes: the second waveform transitions from the enabling state to the non-enabling state before the first waveform transitions from the enabling state to the non-enabling state.

In some embodiments, a generator (to generate a power-on (PO) signal (PO signal generator)) includes: a supply-variation sensitivity-reducing (SVSR) device coupled between a first reference voltage and a first node, the SVSR device including a first switch and a first load coupled serially; a second switch coupled between the first node and a second reference voltage; and a buffer having an input coupled to the first node and an output configured to provide a PO signal.

In some embodiments, the first switch of the SVSR device includes a control input; and the second switch includes a control input; the control inputs of each of the first switch and the second switch is coupled to a monitored voltage; and the monitored voltage is in a range between the first reference voltage and a second reference voltage. In some embodiments, the SVSR device further includes: a second resistor coupled and a third switch coupled in parallel between the first reference voltage and a second node; the third switch of the SVSR device includes a control input; and the control input of the third switch is coupled to a third node, the third node being internal to the buffer. In some embodiments, the buffer includes: a first inverter coupled between the second node and the third node; and a second inverter having an input coupled to the third node and an output configured to provide the PO signal.

In some embodiments, a generator (to generate a power-on (PO) signal (PO signal generator)) includes: a supply-variation sensitivity-reducing (SVSR) device coupled between a first reference voltage and a first node, the SVSR device including a first switch and a first load coupled in series between the first node and a second node, and a second resistor coupled and a second switch coupled in parallel between the second node and a first reference voltage, each of the first and second switches including a corresponding control input, a third switch coupled between the first node and a second reference voltage, the third switch including a control input, the control inputs of each of the first switch and the third switch being coupled to a monitored voltage; and a buffer having an input coupled to the first node and an output configured to provide a PO signal, the control input of the second switch being coupled to a third node, the third node being internal to the buffer; and wherein a voltage on the third node represents a threshold voltage of the generator; and the threshold voltage of the generator; exhibits hysteresis with respect to the monitored voltage.

In some embodiments, the buffer includes: a first inverter coupled between the second node and the third node; and a second inverter having an input coupled to the third node and an output configured to provide the PO signal.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of generating multiple gating signals for a multi-gated input/output (I/O) system that includes an output level shifter and an output driver which are coupled in series between an output node of a core circuit and an external terminal of a corresponding system, the method comprising:
    generating first and second gating signals having corresponding first and second waveforms, the first and second waveforms being free from relating as waveform-inversions of each other, and the first waveform transitioning from a non-enabling state to an enabling state before the second waveform transitions from the non-enabling state to the enabling state;
    receiving the first gating signal at the output level shifter; and
    receiving the second gating signal at the output driver.

2. The method of claim 1, further comprising:
    delaying a power-on control (POC) signal to produce a first delayed version of the POC signal (first delayed signal); and
    delaying the first delayed signal to produce a second delayed signal; and
    wherein the generating first and second gating signals includes:
        basing the first and second gating signals correspondingly on one or more of the POC signal, the first delayed signal or the second delayed signal.

3. The method of claim 2, further comprising:
    delaying the second delayed signal to produce a third delayed signal; and
    wherein the basing the first and second gating signals includes:
        forming the first gating signal according to the POC signal and the third delayed signal; and
        forming the second gating signal according to the first delayed signal and the second delayed signal.

4. The method of claim 3, wherein:
    the multi-gated input/output (I/O) system further includes an input buffer and an input level shifter which are coupled in series between the external terminal and an input node of the core circuit; and
    the method further comprises:
        generating third and fourth gating signals having corresponding third and fourth waveforms;
            the third waveform transitioning from the non-enabling state to the enabling state after the second waveform transitions from the non-enabling state to the enabling state; and
            the third waveform transitioning from the non-enabling state to the enabling state before the fourth waveform transitions from the non-enabling state to the enabling state;
        receiving the third gating signal at the input buffer; and
        receiving the fourth gating signal at the input level shifter.

5. The method of claim 4, wherein generating the third and fourth gating signals includes:
    forming the third gating signal according to the first delayed signal and the second delayed signal; and
    forming the fourth gating signal according to the third delayed signal and the POC signal.

6. The method of claim 5, wherein:
    the forming the third gating signal includes:
        inverting the POC signal to form a POC_bar signal;
        inverting the first delayed signal to form a first delayed_bar signal;
        inverting the second delayed signal to form a second delayed_bar signal;
        inverting the third delayed signal to form a third delayed_bar signal; and
        making a logical NAND combination of the first delayed_bar signal and the second delayed_bar signal resulting in the third gating signal; and
    the forming the fourth gating signal includes:
        making a logical NAND combination of the POC_bar signal and the third delayed_bar signal resulting in the fourth gating signal.

7. The method of claim 4, wherein:
    the fourth waveform transitions from the enabling state to the non-enabling state before the third waveform transitions from the enabling state to the non-enabling state.

8. The method of claim 3, wherein:
the forming the first gating signal includes:
    inverting the POC signal to form a POC_bar signal;
    inverting the third delayed signal to form a third delayed_bar signal; and
    making a logical NOR combination of the POC_bar signal and the third delayed_bar signal resulting in the first gating signal; and
the generating the second gating signal includes:
    inverting the first delayed signal to form a first delayed_bar signal; and
    inverting the second delayed signal to form a second delayed_bar signal; and
    making a logical NOR combination of first delayed signal and the second delayed_bar signal resulting in the second gating signal.

9. The method of claim 2, wherein:
the multi-gated input/output (I/O) system further includes an input buffer and an input level shifter which are coupled in series between the external terminal and an input node of the core circuit; and
the method further comprises:
    receiving the second gating signal at the input buffer.

10. The method of claim 9, wherein:
the basing the first and second gating signals includes:
    forming the first gating signal according to the POC signal and the second delayed signal; and
    forming the second gating signal according to the first delayed signal.

11. The method of claim 10, wherein:
the forming the first gating signal includes:
    inverting the POC signal to form a POC_bar signal;
    inverting the second delayed signal to form a second delayed_bar signal; and
    making a logical NOR combination of the POC_bar signal and the second delayed_bar signal resulting in the first gating signal; and
the forming the second gating signal includes:
    inverting the first delayed signal to form a first delayed_bar signal; and
    inverting the first delayed signal to form a second delayed_bar signal; and
    inverting the second delayed_bar signal resulting in the second gating signal.

12. The method of claim 11, further comprising:
generating a third gating signal having a third waveform;
    the third waveform transitioning from the non-enabling state to the enabling state after the second waveform transitions from the non-enabling state to the enabling state; and
receiving the third gating signal at the input level shifter.

13. The method of claim 2, wherein:
the multi-gated input/output (I/O) system further includes an input buffer and an input level shifter which are coupled in series between the external terminal and an input node of the core circuit; and
the method further comprises:
    receiving the first gating signal at each of the input buffer and the input level shifter.

14. The method of claim 1, wherein:
the second waveform transitions from the enabling state to the non-enabling state before the first waveform transitions from the enabling state to the non-enabling state.

15. A generator to generate a power-on (PO) signal (PO signal generator), the PO signal generator comprising:
    a supply-variation sensitivity-reducing (SVSR) device coupled between a first reference voltage and a first node, the SVSR device including a first switch and a first load coupled serially;
    a second switch coupled between the first node and a second reference voltage; and
    a buffer having an input coupled to the first node and an output configured to provide the PO signal.

16. The PO signal generator of claim 15, wherein:
the first switch of the SVSR device includes a control input; and
the second switch includes a control input;
the control inputs of each of the first switch and the second switch are coupled to a monitored voltage; and
the monitored voltage is in a range between the first reference voltage and the second reference voltage.

17. The PO signal generator of claim 16, wherein:
the SVSR device further includes:
    a resistor and a third switch coupled in parallel between the first reference voltage and a second node;
the third switch of the SVSR device includes a control input; and
the control input of the third switch is coupled to a third node, the third node being internal to the buffer.

18. The PO signal generator of claim 17, wherein:
the buffer includes:
    a first inverter coupled between the second node and the third node; and
    a second inverter having an input coupled to the third node and an output configured to provide the PO signal.

19. A generator to generate a power-on (PO) signal (PO signal generator), the PO signal generator comprising:
    a supply-variation sensitivity-reducing (SVSR) device coupled between a first reference voltage and a first node, the SVSR device including:
        a first switch and a first load coupled in series between the first node and a second node; and
        a resistor and a second switch coupled in parallel between the second node and a first reference voltage;
        each of the first and second switches including a corresponding control input;
    a third switch coupled between the first node and a second reference voltage, the third switch including a control input;
    the control inputs of each of the first switch and the third switch being coupled to a monitored voltage; and
    a buffer having an input coupled to the first node and an output configured to provide the PO signal, the control input of the second switch being coupled to a third node, the third node being internal to the buffer; and
    wherein a voltage on the third node represents a threshold voltage of the generator; and
    the threshold voltage of the generator exhibits hysteresis with respect to the monitored voltage.

20. The PO signal generator of claim 19, wherein:
the buffer includes:
    a first inverter coupled between the second node and the third node; and
    a second inverter having an input coupled to the third node and an output configured to provide the PO signal.

* * * * *